(12) United States Patent
Ribi

(10) Patent No.: US 9,746,380 B2
(45) Date of Patent: Aug. 29, 2017

(54) ADVANCED MULTI-ELEMENT CONSUMABLE-DISPOSABLE PRODUCTS

(71) Applicant: Segan Industries, Inc., Burlingame, CA (US)

(72) Inventor: Hans O. Ribi, Hillsborough, CA (US)

(73) Assignee: Segan Industries, Inc., Burlingame, CA (US)

( * ) Notice: Subject to any disclaimer, the term of this patent is extended or adjusted under 35 U.S.C. 154(b) by 27 days.

(21) Appl. No.: 14/348,574

(22) PCT Filed: Sep. 28, 2012

(86) PCT No.: PCT/US2012/058090
§ 371 (c)(1),
(2) Date: Mar. 28, 2014

(87) PCT Pub. No.: WO2013/049696
PCT Pub. Date: Apr. 4, 2013

(65) Prior Publication Data
US 2014/0221528 A1 Aug. 7, 2014

Related U.S. Application Data

(60) Provisional application No. 61/542,085, filed on Sep. 30, 2011.

(51) Int. Cl.
| | |
|---|---|
| *A47G 19/00* | (2006.01) |
| *G01K 1/00* | (2006.01) |
| *A47G 21/00* | (2006.01) |
| *G01K 11/12* | (2006.01) |
| *A47G 21/04* | (2006.01) |
| *A47G 21/18* | (2006.01) |
| *B01F 13/00* | (2006.01) |
| *B65D 1/36* | (2006.01) |

(52) U.S. Cl.
CPC ............... *G01K 1/00* (2013.01); *A47G 19/00* (2013.01); *A47G 21/00* (2013.01); *A47G 21/04* (2013.01); *A47G 21/182* (2013.01); *B01F 13/002* (2013.01); *B65D 1/36* (2013.01); *G01K 11/12* (2013.01); *A47G 2200/08* (2013.01); *A47G 2200/16* (2013.01); *G01K 2207/00* (2013.01)

(58) Field of Classification Search
CPC ....... A47G 19/00; A47G 21/00; A47G 21/182
USPC .............................................. 206/459.1, 459.5
See application file for complete search history.

(56) References Cited

U.S. PATENT DOCUMENTS

| | | |
|---|---|---|
| 3,309,274 A | 3/1967 | Brilliant et al. |
| 3,710,115 A | 1/1973 | Jubb |
| 3,999,946 A | 12/1976 | Patel et al. |
| 4,001,446 A | 1/1977 | Hood |
| 4,150,106 A | 4/1979 | Assal et al. |
| 4,208,186 A | 6/1980 | Patel |
| 4,238,352 A | 12/1980 | Patel |
| 4,276,190 A | 6/1981 | Patel |
| 4,339,240 A | 7/1982 | Patel et al. |
| 4,339,951 A | 7/1982 | Yee et al. |
| 4,344,909 A | 8/1982 | De Blauwe |
| 4,381,260 A | 4/1983 | Chu et al. |
| 4,389,217 A | 6/1983 | Baughman |
| 4,439,346 A | 3/1984 | Patel et al. |
| 4,520,376 A | 5/1985 | Morishita et al. |
| 4,667,869 A | 5/1987 | Gen et al. |
| 4,705,513 A | 11/1987 | Sheldon et al. |
| 4,717,710 A | 1/1988 | Shimizu et al. |
| 4,721,769 A | 1/1988 | Rubner |
| 4,737,463 A | 4/1988 | Bhattacharjee et al. |
| 4,847,066 A | 7/1989 | Honigs et al. |
| 4,853,235 A | 8/1989 | Tomomasu |
| 4,859,538 A | 8/1989 | Ribi et al. |
| 4,871,811 A | 10/1989 | Gaku et al. |
| 4,892,677 A | 1/1990 | Preziosi et al. |
| 4,931,051 A | 6/1990 | Castello |
| 4,957,949 A | 9/1990 | Kamada et al. |
| 5,006,494 A | 4/1991 | Virkar |
| 5,028,792 A | 7/1991 | Mullis |
| 5,051,597 A | 9/1991 | Lewis et al. |
| 5,053,339 A | 10/1991 | Patel |
| 5,085,801 A | 2/1992 | Thierry et al. |
| 5,144,112 A | 9/1992 | Wyatt et al. |
| 5,156,810 A | 10/1992 | Ribit |
| 5,176,905 A | 1/1993 | Ohno et al. |
| 5,189,281 A | 2/1993 | Wyatt et al. |

(Continued)

FOREIGN PATENT DOCUMENTS

| | | |
|---|---|---|
| CA | 2070749 C | 12/1992 |
| CN | 1894108 A | 1/2007 |

(Continued)

OTHER PUBLICATIONS

"Consumable". Dictionary.com. Online. Internet. Accessed on Mar. 14, 2006. <http://dictionary.reference.com/search?q=consumable>.

(Continued)

*Primary Examiner* — Edward Cain
(74) *Attorney, Agent, or Firm* — Khin K. Chin; Bret E. Field; Bozicevic, Field & Francis LLP

(57) ABSTRACT

The invention involves the incorporation and enablement of multiple interactive elements into high-volume consumables products to increase utility, function and features of the consumable product at minimal incremental cost and adjustment to production and manufacturing processes. The invention further reports processes and compositions that enable consumable products with differentiating features which product would otherwise be deficient for their intended use and application.

15 Claims, 23 Drawing Sheets

(56) References Cited

U.S. PATENT DOCUMENTS

| | | | |
|---|---|---|---|
| 5,208,132 A | 5/1993 | Karnada et al. |
| 5,250,492 A | 10/1993 | Dotson et al. |
| 5,273,360 A | 12/1993 | Wyatt et al. |
| 5,387,798 A | 2/1995 | Funakoshi et al. |
| 5,411,835 A | 5/1995 | Brinser |
| 5,415,544 A | 5/1995 | Oxman et al. |
| 5,415,999 A | 5/1995 | Saul et al. |
| 5,420,000 A | 5/1995 | Patel et al. |
| 5,514,635 A | 5/1996 | Filo |
| 5,581,090 A | 12/1996 | Goudjil |
| 5,599,525 A | 2/1997 | Hsu et al. |
| 5,612,541 A | 3/1997 | Hoffmann et al. |
| 5,618,735 A | 4/1997 | Saul et al. |
| 5,622,872 A | 4/1997 | Ribi |
| 5,628,934 A | 5/1997 | Ohno et al. |
| 5,685,641 A | 11/1997 | Ribi |
| 5,788,375 A | 8/1998 | Parker et al. |
| 5,817,599 A | 10/1998 | Iida et al. |
| 5,895,718 A | 4/1999 | Ishimura et al. |
| 5,918,981 A | 7/1999 | Ribi |
| 5,989,573 A | 11/1999 | Remy |
| 6,022,648 A | 2/2000 | Ribi et al. |
| 6,046,455 A | 4/2000 | Ribi et al. |
| 6,103,217 A | 8/2000 | Charych |
| 6,103,459 A | 8/2000 | Diel |
| 6,160,084 A | 12/2000 | Langer et al. |
| 6,183,772 B1 | 2/2001 | Charych et al. |
| 6,241,913 B1 | 6/2001 | Angelopoulos et al. |
| 6,277,652 B1 | 8/2001 | Jo et al. |
| 6,306,598 B1 | 10/2001 | Charych et al. |
| 6,330,730 B1 | 12/2001 | Davies et al. |
| 6,389,636 B1 | 5/2002 | Savill |
| 6,465,791 B1 | 10/2002 | Ribi et al. |
| 6,468,759 B1 | 10/2002 | Charych |
| 6,472,214 B2 | 10/2002 | Patel |
| 6,485,300 B1 | 11/2002 | Muller et al. |
| 6,528,954 B1 | 3/2003 | Lys et al. |
| 6,544,925 B1 | 4/2003 | Prusik et al. |
| 6,579,826 B2 | 6/2003 | Furuya et al. |
| 6,607,744 B1 | 8/2003 | Ribi |
| 6,613,363 B1 | 9/2003 | Li |
| 6,623,698 B2 | 9/2003 | Kuo |
| 6,670,436 B2 | 12/2003 | Burgath et al. |
| 6,787,108 B2 | 9/2004 | Ribi |
| 6,866,863 B2 | 3/2005 | Ribi |
| 7,223,270 B2 | 5/2007 | Altshuler et al. |
| 7,776,371 B2 | 8/2010 | Ribi et al. |
| 7,813,025 B2 | 10/2010 | Ribi et al. |
| 8,569,208 B1 | 10/2013 | Ribi |
| 8,617,900 B2 | 12/2013 | Ribi |
| 2002/0034475 A1 | 3/2002 | Ribi |
| 2002/0102674 A1 | 8/2002 | Anderson |
| 2003/0103905 A1 | 6/2003 | Ribi |
| 2003/0143188 A1 | 7/2003 | Ribi |
| 2003/0226978 A1 | 12/2003 | Ribi |
| 2005/0036300 A1 | 2/2005 | Dowling et al. |
| 2005/0088355 A1 | 4/2005 | Kralovec et al. |
| 2005/0109984 A1 | 5/2005 | Potyrailo et al. |
| 2005/0193510 A1 | 9/2005 | Kemp |
| 2006/0054838 A1 | 3/2006 | Ribi |
| 2006/0276385 A1 | 12/2006 | Jo et al. |
| 2007/0053856 A1 | 3/2007 | Ribi |
| 2007/0071680 A1 | 3/2007 | Ribi |
| 2007/0251912 A1 | 11/2007 | Sixou et al. |
| 2007/0259598 A1 | 11/2007 | Ribi |
| 2007/0295689 A1 | 12/2007 | Clauss et al. |
| 2008/0296513 A1 | 12/2008 | Ribi et al. |
| 2009/0130030 A1 | 5/2009 | Ribi et al. |
| 2009/0206080 A1 | 8/2009 | Ribi et al. |
| 2010/0012018 A1 | 1/2010 | Ribi et al. |
| 2010/0029004 A1 | 2/2010 | Ribi et al. |
| 2010/0247223 A1 | 9/2010 | Ribi et al. |
| 2010/0322874 A1 | 12/2010 | Ribi et al. |
| 2011/0008498 A1 | 1/2011 | Ribi et al. |
| 2011/0091391 A1 | 4/2011 | Ribi et al. |
| 2011/0140057 A1 | 6/2011 | Ribi et al. |
| 2011/0148984 A1 | 6/2011 | Ribi et al. |
| 2011/0165693 A1 | 7/2011 | Ribi et al. |
| 2011/0211248 A1 | 9/2011 | Ribi et al. |
| 2012/0266806 A1 | 10/2012 | Ribi et al. |
| 2013/0061798 A1 | 3/2013 | Ribi et al. |
| 2013/0077148 A1 | 3/2013 | Ribi |
| 2014/0106963 A1 | 4/2014 | Ribi |
| 2014/0145112 A1 | 5/2014 | Ribi |

FOREIGN PATENT DOCUMENTS

| | | |
|---|---|---|
| CN | 101068686 A | 11/2007 |
| CN | 101103877 A | 1/2008 |
| EP | 353650 A2 | 2/1990 |
| EP | 0610072 A1 | 10/1994 |
| JP | 61154993 U | 7/1986 |
| JP | 61250080 | 11/1986 |
| JP | S63-160897 | 10/1988 |
| JP | S64-6992 | 1/1989 |
| JP | 3033538 U | 11/1996 |
| JP | 3034028 U | 11/1996 |
| JP | 10-017622 A | 1/1998 |
| JP | 2002006280 | 1/2002 |
| WO | WO9939167 | 8/1999 |
| WO | WO0130211 A2 | 5/2001 |
| WO | WO0200920 | 1/2002 |
| WO | WO03037391 | 5/2003 |
| WO | WO2004090629 | 10/2004 |
| WO | WO2005028524 | 3/2005 |
| WO | WO2005029163 | 3/2005 |
| WO | WO2005036109 | 4/2005 |
| WO | WO2005123023 | 12/2005 |
| WO | WO2007111702 | 10/2007 |
| WO | WO2008051550 | 5/2008 |
| WO | WO2008079357 | 7/2008 |

OTHER PUBLICATIONS

"Food Facts", U.S. Food and Drug Administration, Brochure: Jan. 1993, pp. 1-6.
Database WPI Week 200228; Thompson Scientific, London GB; AN 2002-2215741 XP002535493.
Dr. Fresh Fly Series Children's Toothbrush; http://www.dentistneUfire-fly-toothbrush.asp (Nov. 19, 2008) (4pp).
Keum et al. Bull Korean Chem. Soc. (1995) 16:1007.
Lendlein et al. "Shape-Memory Polymers". Angew. Chem. In. Ed. (Jun. 2002) pp. 2035-2057.
Ma et al., "Colorimetric Detection of *Escherichia coli* by Polydiacetylene Vesicles Functionnalized with Glycolipid", Journal of the American Chemical Society, vol. 120, No. 48. pp. 12678-12679 (1998).
Ma Zhanfang et al., "Color-changeable vesicles of polydiacetylenic matrix incorporating glycolipid based on physical force", Acta Physico-Chimica Sinica, 15(2): 101-104 (1999).
Oral B. Laboratories, Inc.; http://www.oralb.com/en-us/ (Nov. 19, 2008) (1p).
Tesini, DA, Perlman SP, "The Effect of a Color Changing Toothbrush With and Without Instruction on the Duration of Tooth Brushing" (Pediatr. Dent. 19941 16:224-226) Abstract AAPD Journal.
Ultra-Clean™ Specific Toohbrush Sanitizer, UV Solutions; LLC., MA; http://www.uv-ultraclean.com (Nov. 19, 2008) 2pp.

ADVANCED MULTI-ELEMENT CONSUMABLE-DISPOSABLE PRODUCTS

CROSS-REFERENCE TO RELATED APPLICATIONS

Pursuant to 35 U.S.C. §119 (e), this application claims priority to the filing dates of U.S. Provisional Patent Application Ser. No. 61/542,085 filed Sep. 30, 2011; the disclosure of which application is herein incorporated by reference.

INTRODUCTION

Consumable products such as disposable drinking straws, cups, lids, plates, utensils, disposable cooking thermometers, stir sticks, containers, packaging and other related items that are generally used for in relationship with food preparation, service, cooking, fast food restaurants, convenience stores, quick service restaurants, and the like are pervasive in today's society. There is an on-going need to improve the performance, features, capabilities, function, and value of such products. Product improvements at affordable costs are increasing in demand.

SUMMARY

The invention involves the incorporation and enablement of multiple interactive elements into high-volume consumable products to increase utility, function and features of the consumable product at minimal incremental cost and adjustment to production and manufacturing processes. The invention further reports processes and compositions that enable consumable products with differentiating features which product would otherwise be deficient for their intended use and application.

DETAILED DESCRIPTION

Figure 1A:
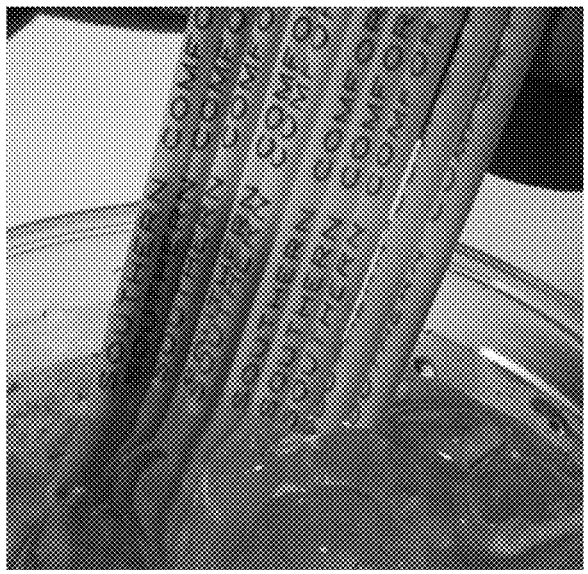
FIGS. 1A and 1B provide pictures of straws that include both color change capabilities and laser marked text imaging, according to certain embodiments of the invention.

The invention involves the incorporation and enablement of multiple interactive elements into high-volume consumable products to increase utility, function and features of the consumable product at minimal incremental cost and adjustment to production and manufacturing processes. The invention further reports processes and compositions that enable consumable products with differentiating features which product would otherwise be deficient for their intended use and application.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Herein we describe the incorporation and enablement of multiple interactive elements into high-volume consumables products to increase utility, function and features of the consumable product at minimal incremental cost and adjustment to production and manufacturing processes. The invention further reports processes and compositions that enable consumable products with differentiating features which products would otherwise be deficient for their intended use and application.

In particular, there is an on-going need to improve the performance, features, capabilities, function, and value of consumable products such as disposable drinking straws, cups, lids, plates, utensils, disposable cooking thermometers, stir sticks, containers, packaging and other related items that are generally used for in relationship with food preparation, service, cooking, fast food restaurants, convenience stores, quick service restaurants, and the like. Product improvements at affordable costs are increasing in demand. Innovation that provide minimal cost impact to customer can include, but are not limited to physical/structural benefits, visual appearances including color intensity and novel color shift or color change properties, new printing methods and technologies that enable digital on-demand information to be rapidly encoded, new ways to customize products on-demand, features that facilitate and enable new promotional and sales options, tactile structural features for improved contact feel and grip, improved insulating features without introducing incremental waste, bio-compatible, biodegradable, and landfill degradable properties aimed at reducing environmental impact, environmental sensing abilities to add interactive indicating features and the like.

Importantly, new chemical formulations, compositions, compounds, materials, and additives are required alone or in combinations, that enable the incorporation of novel physical, chemical, and optical properties for multi-element product applications. In addition, new processing, fabrication, on-demand, tooling, in-line production, materials handling, and application methods will be required for incorporating multi-element materials, compositions and additives into final products. Finally, novel packaging, interactive packaging, inks, plastics, compounded materials, packaging methods, marking methods and the like will find application to the presentation, sales, and marketing of products comprising multi-element compositions, and features.

Messaging, Marking and Printing Systems:

By way of example, not limitation, laser etching, laser marking, laser ablation of one layer, localized plasma treatment, chemical patterning and imprinting, photo-masking and optical exposure, screen printing, drop-on-demand printing (DOD), continuous ink jet printing (CIJ), pad printing, continuous roller printing, on-the-fly marking, marking directionally with product production, marking parallel to product production, electron beam marking, localized plasma marking for differential patterning, and the like can be utilized or adapted as manufacturing processes for high-speed messaging on plastics consumable items.

Ink jet printing processes such as drop-on-demand (DOD) and continuous ink jet (CIJ) printing have the advantage of color variety. In addition, DOD and CIJ processes can be integrated into high speed production processes such as extrusion, thermoforming and injection molding. Likewise, DOD and CIJ printing inks can be formulated as standard colors, with thermochromic colorants, photo-chromic colorants and other optically enhanced color systems to generate a range of different optical effects in high volume consumable products. DOD and CIJ systems have the additional advantage of on-line unique digital coding thereby providing the ability to create unique images, symbols, codes, and messages on each item under production under a continuous process.

Laser marking finds application with eliminating the need for a consumable ink to be utilized during the high-speed marking process. Additives can be conveniently added to the resins used for extrusion, thermoforming and injection molding thereby eliminating the need to add inks or dyes to the printing systems since the substrate can be comprised using the marking additive intrinsically. Like DOD and CIJ systems have the additional advantage of on-line unique digital coding thereby providing the ability to create unique images, symbols, codes, and messages on each item under production under a continuous process.

Screen printing processes have the advantage of providing a thick and rich color coating and can utilize a range of inks with additive described herein. Screen printing inks printing can be formulated as standard colors, with thermochromic colorants, photo-chromic colorants and other optically enhanced color systems to generate a range of different optical effects in high volume consumable products. Screen printing does however require detailed fixtures for printing alignment and the process is not amenable to continuous printing. Highly-automate forms of screen printing find certain advantages when combined and utilized with the additives and applications described below.

Pad printing like screen printing processes have the advantage of providing a thick and rich color coating and can utilize a range of inks with additive described herein. Screen printing inks printing can be formulated as standard colors, with thermochromic colorants, photo-chromic colorants and other optically enhanced color systems to generate a range of different optical effects in high volume consumable products. Pad printing does however require detailed fixtures for printing alignment and the process is not amenable to continuous printing. Highly-automate forms of pad printing find certain advantages when combined and utilized with the additives and applications described below.

As further described below, laser marking and/or messaging can be accomplished in different formats depending on the laser wave length, power or intensity, frequency utilized, additives to the consumable product utilized, speed at which marking is utilized and related factors that may influence the speed, print quality, substrate composition, and ease of manufacturing. By way of example, but not limitation, YAG, YVO4, $CO_2$, UV, IR, argon ion, x-ray laser methods can be employed.

Basic laser marking irradiation of the polymer/plastic substrate with a high-energy radiation source such as a laser. The radiant energy is then absorbed locally by the material and converted to thermal energy. The thermal energy induces reactions to occur in the material. Several types of reactions are possible. Marking reactions can include charring, ablation and foaming.

Charring occurs when the energy absorbed raises the local temperature of the material surrounding the absorption site high enough to cause thermal degradation of the polymer. While charring can result in burning of the polymer in the presence of oxygen, the limited supply of oxygen in the interior of the work piece results in charring of the polymer to form a black mark.

Foaming occurs when the local polymer temperature surrounding the absorption site is sufficiently high that the polymer degrades to gases via burning or evaporation. The hot gases are themselves surrounded by molten polymer and expand to form bubbles. The bubbles may break out to the surface of the material resulting in cratering or trenching. If the energy of the laser is controlled, foaming can result in bubbles that scatter light in a way that results in a light mark. The process lends itself to produce a light, high contrast mark when the substrate is dark.

Ablation processes can be utilized whereby the absorbed energy is very high, resulting in the total evaporation of the polymer to produce a depression with little residual char or cratering. Material is removed from the substrate often resulting in an engraved look with little or no change in coloration. The ablation process often found to work well when carbon black is used for coloration due to the high laser energy absorption and heat generation. Other colorants can be utilized along with carbon black, carbon nano-tubes, fullerene-based materials, metallized pigments, vapor deposited metals, and other suitable ablation additives.

Early laser marking systems utilized $CO_2$ lasers with a radiation frequency of 10.6 microns—well into the IR region. $CO_2$ systems passed the laser light through a mask to shape the image, then focused the image onto the substrate. The $CO_2$ laser is pulsed onto the substrate, resulting in an instantaneous energy buildup in the polymer. "Dot matrix" $CO_2$ laser marking systems find use where the beam is formed into dots that generate the image similar to a dot matrix printer. Continuous beam $CO_2$ lasers are now utilized as light pens to laser mark, but they suffer from less system energy flexibility.

Currently YAG lasers at 1064 nm wavelength are popular in the laser marking industry due to their variable power and flexibility. This results in greater marking speeds and higher turnaround times for the end user relative to the $CO_2$ laser marking systems. A fast growing technology is that of fiber lasers, which operate at 1064 nm but require less power/cooling, provide high power density, and long operating lifetimes. The ability to change numerous laser parameters provides these laser systems with the ability to draw with greater finesse than $CO_2$ laser systems.

A beam steered laser marking system consists of laser that is focused onto the material to be marked with a large field lens. The beam is steered across the substrate to generate the mark by independent computer controlled mirrors and galvo laser drive systems. A substantial part of the system involves the material handling unit that moves the pieces to be marked with precision at high speeds. Systems must position the material and retain it in the focal plane of the laser beam for optimum marking speed and quality.

Co-Extruded Straws:

Co-extruded straws and profiled consumable items have the advantage of hiding or obscuring internal plastic colors such as recycled plastics. The process of co-extrusion provides a new platform for creating specialized optical effects and can be used as the basis for high speed laser marking in a way that obviates the use of additional laser marking additives.

The process of co-extrusion can be utilized to create 2 or more inner laminate layers in the wall of a straw. Outer layers can be used for color masking, optical enhancements of under layers, for coating laser ablation outer layer so that under layers can be exposed as a new revealing color to generate high-speed messaged straws, straws marked as bio-degradable or landfill degradable compositions, straws marked individually for recycling, message reveal effects when used in combination with thermochromic or photochromic compositions, textured surfaces, and a wide range of other optical and physical features that provide enhanced value to a straw or other consumable product.

Raised 3D Laser Embossed and Simultaneous Color Change:

A multi-element composition can be prepared and added to consumable plastic products whereby the plastic composition can have multiple features including being laser markable, that the marking can be debossed or raised above the plain of the surface, and have color change/optical characteristics. Expandable color change compositions can include, but are not limited to the addition of a pliable shape memory resin component, a laser stimulated component such as aluminum metal flake, and a color change component such as a microencapsulated leuco dye.

Recyclable Straws and Other Consumable Items:

Straws are not currently considered recyclable since recyclable items require the recycling symbol. We have developed a high speed marking method that enables each straw to be inscribed or marked with the recycling symbol and therefore be candidates for recycling. Tens of billions of straw are disposed in landfills each year in the US and more than 50 billion WW each year. Straws are made with polypropylene which is a recyclable material, but without the recycle symbol on a straw, it will not be picked up by recycling companies. We describe below high-speed on-demand methods for imprinting each straw with the recycling symbol in a digital and affordable format. The process is unique and non-obvious for the application.

Number 1 plastics: PET or PETE (polyethylene terephthalate) are found in: soft drink, water and beer bottles; mouthwash bottles; peanut butter containers; salad dressing and vegetable oil containers; ovenable food trays. Recycling: PET or PETE can be picked up through most curbside recycling programs. PET or PETE are often recycled into: Polar fleece, fiber, tote bags, furniture, carpet, paneling, straps, (occasionally) and new containers. PET plastic is the most common for single-use bottled beverages, because it is inexpensive, lightweight and easy to recycle. It poses low risk of leaching breakdown products. Recycling rates remain relatively low (around 20%), though the material is in high demand by re-manufacturers.

Number 2 Plastics: HDPE (high density polyethylene) is found in: milk jugs, juice bottles; bleach, detergent and household cleaner bottles; shampoo bottles; some trash and shopping bags; motor oil bottles; butter and yogurt tubs; cereal box liners and the like. Recycling: HDPE can be picked up through most curbside recycling programs, although some allow only those containers with necks. HDPE can be recycled into: laundry detergent bottles, oil bottles, pens, recycling containers, floor tile, drainage pipe, lumber, benches, doghouses, picnic tables, fencing, and the like. HDPE is a versatile plastic with many uses, especially for packaging. It carries low risk of leaching and is readily recyclable into many goods.

Number 3 Plastics: V (Vinyl) or PVC is found in: window cleaner and detergent bottles, shampoo bottles, cooking oil bottles, clear food packaging, wire jacketing, medical equipment, siding, windows, piping. V can be recycled by some plastic lumber makers and recycled into: decks, paneling, mud flaps, roadway gutters, flooring, cables, speed bumps, and mats. PVC is tough and weathers well, so it is commonly used for piping, siding and similar applications. PVC contains chlorine, so its manufacture can release highly dangerous dioxins. If you must cook with PVC, don't let the plastic touch food. Also never burn PVC, because it releases toxic side compounds.

Number 4 Plastics: LDPE (low density polyethylene) can be found in: squeezable bottles; bread, frozen food, dry cleaning and shopping bags; tote bags; clothing; furniture; carpets, and the like. LDEP can be recycled through certain: LDPE curbside programs, but only some communities will accept it. Plastic shopping bags made of LDPE can be returned to many stores for recycling. It can be recycled into: trash can liners and cans, compost bins, shipping envelopes, paneling, lumber, landscaping ties, floor tile, and the like. LDPE is a flexible plastic with many applications. Historically it has not been accepted through most American curbside recycling programs, but more and more communities are starting to accept it.

Number 5 plastics: PP (polypropylene) is considered a number 5 plastic and can be found in: Some yogurt containers, syrup bottles, ketchup bottles, caps, straws, and medicine bottles. Recycling: number 5 plastics can be recycled through some curbside programs. PP is most often recycled into: signal lights, battery cables, brooms, brushes, auto battery cases, ice scrapers, landscape borders, bicycle racks, rakes, bins, pallets, trays, straws, certain cups and the like. Polypropylene has a high melting point, and so is becoming more accepted by recyclers. Polypropylene is the major material used in drinking straw manufacturing and is rapidly becoming the material of choice for producing deep draw cups and lids for the food service industry.

Number 6 Plastics: PS (polystyrene) can be found in: disposable plates and cups, cup lids meat trays, egg cartons, carry-out containers, aspirin bottles, compact disc cases, and the like Recycling: Number 6 plastics can be recycled through some curbside programs. PS can be recycled into: insulation, light switch plates, egg cartons, vents, rulers, foam packing, carry-out containers, and other consumable items. Polystyrene can be made into rigid or foam products—in the latter case it is popularly known as the trademark Styrofoam. Certain evidence suggests polystyrene can leach potential toxic compounds into foods. The material was long on environmentalists' hit lists for dispersing widely across the landscape, and for being notoriously difficult to recycle. Most communities are gradually increasing acceptances of PS.

Pigment Incorporation and Protection:

Depending on the product application of interest, multi-element additives will either be added direct to the substrate or consumable composition as a monomeric additive or un-protected composition of as a micro-encapsulated and protected composition. Additives may need to be separated from the product composition to avoid matrix effects and influences. Micro-encapsulation provides a simple and direct means for protecting molecular species from adversely reacting with product compositions and processes.

Microencapsulation may be whereby surrounding or enveloping one substance within another substance on a very small scale, yielding capsules ranging from less than one micron to several hundred microns in size. Microcapsules may be spherically or otherwise shaped, with a defined wall surrounding the core, while others are asymmetrically and variably shaped, with a quantity of smaller droplets of core material embedded throughout the microcapsule. Multiple state types may be microencapsulated (solids, liquids, and gases.

Tunable compositions can be micro-encapsulated or non-micro-encapsulated depending on the application of interest. Encapsulate species provide the inherent robustness for many matrices or mediums such as plastics, certain paints, or robust coatings. Un-micro-encapsulated species provide a lower cost means to utilize said compositions where the compositions can be administered to a product application in fewer lest costly steps. Various permutations of encapsulated on un-encapsulated tunable color generation compositions can be utilized. By way of example, but not limitation, developers and color formers can both be un-encapsulated. Alternatively, the developer can be encapsulated where as the color former may be un-encapsulated. In another example, the developer may be un-encapsulated whereas the color former may be encapsulated. In addition, varying degrees of encapsulation may be utilized by one component or another.

Microencapsulation may be achieved by a various standardized and non-standardized techniques depending on the application of interest. Compositions may be microencapsulated with the intention that the core material be confined within capsule walls for a specific period of time. Alternatively, core materials may be encapsulated so that the core material will be released either gradually through the capsule walls, known as controlled release or diffusion, or when external conditions trigger the capsule walls to rupture, melt, or dissolve.

Core materials can include, but are not limited to: the active ingredient or agent, fill, payload, nucleus, or internal phase. The material encapsulating the core is referred to as the coating, membrane, shell, or wall material. Microcapsules may have one wall or multiple shells arranged in strata of varying thicknesses around the core.

Microencapsulated materials are utilized in agriculture, pharmaceuticals, foods, cosmetics and fragrances, textiles, paper, paints, coatings and adhesives, printing applications, safety applications, rapid temperature monitoring, advertising and promotion, low temperature indication, high temperature indication, toy applications, publishing, games, and a wide range other industries and markets.

Carbonless copy paper applications may involve microencapsulated colorless ink that is applied to the top sheet of paper, and a developer is applied to the subsequent sheet. When pressure is applied by writing, the capsules break and the ink reacts with the developer to produce the dark color of the copy.

Others have referred to the use of microencapsulated materials to enhance the properties of finished goods. An increasingly important application utilizes the incorporation of microencapsulated phase change materials. Phase change materials absorb and release heat in response to changes in environmental temperatures. Phase change materials can be purchased from a wide range of chemical vendors (e.g. Microteck Corporation or Bay Materials LLC). With increasing temperatures, the phase change material melts, absorbing excess heat, and feels cool. Conversely, as temperatures fall, the phase change material releases heat as it solidifies, and feels warm. This property of microencapsulated phase change materials can be harnessed to increase the comfort level for users of sports equipment, military gear, bedding, clothing, building materials, and many other consumer products.

Active compositions and agents can be encapsulated to be released over time, allowing farmers to apply the pesticides less often rather than requiring very highly concentrated and perhaps toxic initial applications followed by repeated applications to combat the loss of efficacy due to leaching, evaporation, and degradation. Protecting the active compositions from full exposure to the elements lessens the risk to the environment and those that might be exposed to the chemicals and often provide for a more efficient deployment.

A wide range of food additives, pharmaceuticals, medications, active compositions, sensitizers, dyes, leuco dyes, diacetylenic monomers, polydiacetylenic materials, polymers in general, pesticides, micro-organisms, flavors, fragrances, stimulants, ingestibles, non-ingestibles, drugs, oxidants, anti-oxidants, and the like can be microencapsulated alone or in combination with the active optical change agents describe herein.

Microencapsulation processes can be categorized by chemical processes and mechanical or physical processes including, but not limited to bulk fluid processes, phase separation processes, chemical processes, mechanical shear processes, milling processes, and commercially available processes. Compositions discussed herein can be microencapsulated using coacervation, interfacial polymerization, polymer-polymer incompatibility, phase separation processes, oil-in-water encapsulation, centrifugal processes, high-shear processes, mechanical drying processes, fluid bed coating, Wusrster processes, centrifugal extrusion, ultra-sonication/coating, rotational suspension, double wall micro-encapsulation, chemical silanization processes, liposomal encapsulation, in-line printing/layering processes, heat/chilling cycling, embedding, in-situ polymerization, urea-formaldehyde systems, melamine formaldehyde systems, impregnation, particle coating, and a variety of other micro-particle formation/microencapsulation processes or the like.

Complex coacervation can be employed to provide capsules for use in controlled dry delivery, fragrance samplers, pesticides and cosmetic ingredients. Complex coacervation systems are one of the largest practical applications of products of microencapsulation. In the complex coacervation process gelatin having a high iso-electric point and gum arabic containing many carboxyl groups are added to a core-containing suspension at relatively low pH above 35° C. The gelatin and gum Arabic react to form microdroplets of polymer coacervate which separate. The wall can be subsequently hardened by several means such as by the addition of formaldehyde or glutaraldehyde. In the final steps, the suspension of microcapsules is cooled and the pH raised after which the suspension is filtered leaving the microcapsules on the filter media. Many variations of complex coacervation are known as well as combinations of polymers. Complex coacervation can employed to encapsulate various multi-element additive compositions describe herein.

Non-microencapsulated and micro-encapsulated additives can be added to product substrate compositions from between 0.01% to over 90% depending on the application and utility of the multi-element additive. Typically, the additive will be added from between 0.05% and 50% by weight to the product matrix. More often, the additive will be included from between 0.1% and 25% by weight. Most often, the additive will find use at between 1% and 10% by weight.

Laser Marking Multi-Element Additives:

YAG, YVO4 and UV laser marking pigments provide the necessary conversion of laser light energy to thermal energy for 1064 nm laser marking applications, which facilitates faster marking speeds at low loadings in many polymer systems. In particular, additives are required for marking lead resins such as polypropylene, polyethylene, high density polypropylene, medium density polypropylene, and other key polyolefin based substrates. Marking speeds as high as 190 inches per second have been achieved in some polymer systems.

By way of example, but not limitation we describe the use of antimony-doped tin oxide pigments as an additive that enable the high-speed imaging, messaging, and marking on high-volume low cost plastics consumable items made with PP and PE. Our processes can utilize a range of other commonly used plastics as well. Antimony-doped tin oxide pigments is easily dispersed in polymers as well as liquid colorant systems. Particle size is on the order of 2-3 microns. The appearance of the materials incorporating antimony-doped tin oxide pigments are affected minimally by this low chroma pigment. Typically, antimony-doped tin oxide pigments pigment loading is 0.1% in polyolefins to obtain a high quality mark. Antimony-doped tin oxide pigments is not based on mica or another substrate and, therefore, does not impart a pearlescent, grainy, or reflective appearance.

Stripe, co-extruded layers, vapor deposited layers and the like find use laser ablation processes for marking and messaging. By way of example, polypropylene extruded straws can be produced with an outer stripe or co-extruded layer comprising a composition that is amendable to ablation where as the underlying substrate does not react to the irradiation ablation process. Ablation of the outer layer provides a means of contrast to product letter, images, symbols, messages and the like.

Laser marking additives amenable to use in products comprising polyethylene, polyolifins, and polypropylene include but are not limited to aluminum particulate alone or in combination with titanium dioxide, titanium dioxide alone or with antimony-doped tin oxide, and the like.

Importantly and depending on the product application of interest, speed dependent laser marking can be accomplished in the range from 1 character per second to over 5,000 characters per second. Usually, systems will be used in the range of 10 words or characters per second to 2,500 characters per second in-line and on-going. More often, systems will be utilized under production conditions from 100 to 1,000 characters per second.

Entry points for high-speed messaging and marking systems can be in a variety of entry points that are practical for production of a given consumable product to be printed. By way of example, but not limitation, entry points can include at stages where substrates are heated or in a molten phase. Heated substrates provide the advantage of requiring lower beam energies for effective marking. Marking can be induced after a heating or extrusion process, but prior to a final forming process. Marking/messaging can be accomplished through a processing medium such as a water cooling tank provided that position accuracy of coherent beam is not disturbed by the medium. Messaging can be induced accurately in-line after a consumable has been formed yet is traversing a production stream. Marking can be accomplished after a part is processed but directly prior to packaging. In some cases, marking can be accomplished after packaging provided that the packaging components do not interfere with the beam interacting with the substrate e.g. an open window region.

The approach can be used for straws, cups, spoons, lids, trays, dispensers, bowls, mugs, paper and plastic, various fast food containers, condiment containers, deli dishes, plastic beverage bottles, plates, and a wide range of disposable and reusable containers and implements used for food or other products intended to contain or come in contact with liquid mediums.

Laser marking additives and other additives described herein can be developed doped on carriers, used in their molecular forms, micro-encapsulated by any of a number of means, milled into resins utilized in products, co-extruded, added in powered forms, added in master batch forms, added as dry pseudo master batch forms, liquid master batch forms or the like. Suppliers of raw materials and laser marking additives include, but are not limited to PolyOne (Avon Lake, Ohio), Segan Industries, Inc. (Burlingame, Calif.), and BASF Corp. (Florham Park, N.J.).

Molecular and coated laser marking additives can be added to product substrate compositions from between 0.01% to over 50% depending on the application and utility of the multi-element additive. Typically, the additive will be added from between 0.05% and 25% by weight to the product matrix. More often, the additive will be included from between 0.1% and 10% by weight. Most often, the additive will find use at between 1% and 5% by weight.

Thermochromic Multi-Element Additives:

Thermochromic dyes and colorants can be added to the composition formulation to serve as an indicating means to show that a particular composition has been temperature activated for optimal use. Temperature ranges for thermochromic transitions can be below freezing to above boiling depending on the intended use of the thermochromic composition application. Thermochromic dyes can find use in a variety of compositions and applications and formats. Thermochromic dyes can include but are not limited to compounds including: bis(2-amino-4-oxo-6-methylpyrimidinium)-tetrachlorocuprate(II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium)tetrachlorocuprate(II) and bis(2-amino-4-chloro-6-methylpyrimidinium) hexachlorodicuprate(II), benzo- and naphthopyrans (Chromenes), poly(xylylviologen dibromide, di-beta-naphthospiropyran, Ferrocene-modified bis(spiropyridopyran), isomers of 1-isopropylidene-2-[1-(2-methyl-5-phenyl-3-thienyl)ethylidene]-succinic anhydride and the Photoproduct 7,7adihydro-4,7,7,7a-tetramethyl-2-phenylbenzo[b]thiophene-5,6-dicarboxylic anhydride, micro-encapsulated dyes, precise melting point compositions, infra-red dyes, spirobenzopyrans, spironnapthooxazines, spirothopyran and related compounds, leuco quinone dyes, natural leuco quinone, traditional leuco quinone, synthetic quinones, thiazine leuco dyes, acylated leuco thiazine dyes, nonacylated leuco thiazine dyes, oxazine leuco dyes, acylated oxazine dyes, nonacylated oxazine leuco dyes, catalytic dyes, combinations with dye developers, arylmethane phthalides, diarylmethane phthalides, monoarylmethane phthalides, monoheterocyclic substituted phthalides, 3-heterocyclic substituted phthalides, diarylmethylazaphthalides, bisheterocyclic substituted phthalides, 3,3-bisheterocyclic substituted phthalides, 3-heterocyclic substituted azaphthalides, 3,3-bisheterocyclic substituted azaphthalides, alkenyl substituted phthalides, 3-ethylenyl phthalides, 3,3-bisethylenyl phthalides, 3-butadienyl phthalides, bridged phthalides, spirofluorene phthalides, spirobensanthracene phthalides, bisphthalides, di and triarylmethanes, diphenylmethanes, carbinol bases, pressure sensitive recrcording chemistries, photosensitive recording chemistries, fluoran compounds, reaction of keto acids and phenols, reactions of keto acids with 4-alkoxydiphenylamines, reactions of keto acids sith 3-alkoxdiphenylamines, reactions of 2'-aminofluorans with aralkyl halides, reaction of 3'-chlorofluorans with amines, thermally sensitive recording mediums, tetrazolium salts, tetrazolium salts from formazans, tetrazolium salts from tetazoles, and the like.

Other thermochromic dyes of interest include leucodyes including color to colorless and color to color formulations, vinylphenylmethane-leucocyanides and derivatives, fluoran dyes and derivatives, thermochromic pigments, micro and nano-pigments, molybdenum compounds, doped or undoped vanadium dioxide, indolinospirochromenes, melting waxes, encapsulated dyes, liquid crystalline materials, cholesteric liquid crystalline materials, spiropyrans, polybithiophenes, bipyridine materials, microencapsulated, mercury chloride dyes, tin complexes, combination thermochromic/photochromic materials, heat formable materials which change structure based on temperature, natural thermochromic materials such as pigments in beans, various thermochromic inks commercially available from Segan Industries, Inc., (Burlingame, Calif.), Matsui International Corp. (Gardena Ca), Liquid Crystal Research Crop. (Chicago Il), or any acceptable thermochromic materials with the capacity to report a temperature change or can be photo-stimulated and the like. The chromic change agent selected will depend on a number of factors including cost, material loading, color change desired, levels or color hue change, reversibility or irreversibility, stability, and the like.

Alternative thermochromic materials can be utilized including, but not limited to: light-induced metastable state in a thermochromic copper (II) complex *Chem. Commun.,* 2002, (15), 1578-1579 under goes a color change from red to purple for a thermochromic complex, [Cu(dieten)2] (BF4)2 (dieten=N,N-diethylethylenediamine); encapsulated pigmented materials from Omega Engineering Inc.; bis(2-amino-4-oxo-6-methyl-pyrimidinium)-tetrachlorocuprate (II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium)-tetrachlorocuprate(II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium)tetrachlorocuprate(II) and bis(2-amino-4-chloro-6-methylpyrimidinium) hexachlorodicuprate(II), benzo- and naphthopyrans (Chromenes), poly(xylylviologen dibromide, di-beta-naphthospiropyran, Ferrocene-modified bis(spiropyridopyran), isomers of 1-isopropylidene-2-[1-(2-methyl-5-phenyl-3-thienyl)ethylidene]-succinic anhydride and the Photoproduct 7,7adihydro-4,7,7,7a-tetramethyl-2-phenyl-benzo[b]thiophene-5,6-dicarboxylic anhydride, and the like. Encapsulated leuco dyes are of interest since they can be easily processed in a variety of formats into a plastic or putty matrix. Liquid crystal materials can be conveniently applied as paints or inks to surfaces of color/shape/memory composites.

Thermochromic color to colorless options can include by way of example, but not by limitation: yellow to colorless, orange to color less, red to colorless, pink to colorless, magenta to colorless, purple to colorless, blue to colorless, turquoise to colorless, green to colorless, brown to colorless, black to colorless. Color to color options include but are not limited to: orange to yellow, orange to pink, orange to very light green, orange to peach; red to yellow, red to orange, red to pink, red to light green, red to peach; magenta to yellow, magenta to orange, magenta to pink, magenta to light green, magenta to light blue; purple to red, purple to pink, purple to blue; blue to pink; blue to light green, dark blue to light yellow, dark blue to light green, dark blue to light blue; turquoise to light green, turquoise to light blue, turquoise to light yellow, turquoise to light peach, turquoise to light pink; green to yellow, dark green to orange, dark green to light green, dark green to light pink; brown and black to a variety of assorted colors, and the like. Colors can be deeply enriched using fluorescent and glow-in-the-dark or photo-luminescent pigments as well as related color additives.

Reversible and irreversible versions of the color change agent can be employed depending on the desired embodiment of interest. Reversible agents can be employed where it is desirable to have a multi-use effect or reuse the color change effect. For example, products with continued and repeated use value will find utility of a reversible color change component comprising the final embodiment. In this case it would be desirable to utilize a reversible thermochromic or luminescent material which can be repeated during usage. In another example, it may be desirable to record a single color change permanently. In this case, it would be desirable to utilize a thermochromically irreversible material which changes from one color to another giving rise to a permanent change and indicating that the composition should be discarded after use.

Color change Rainbow effect in consumable consumer products can be accomplished by carefully admixing more than one thermochromic component. Disparity in thermochromic composition transition temperatures in combination with 2 or more thermochromic combinations can be used to achieve a patterned, rainbow, spectral, gradient, or sequential coloration effect.

Random color generating pigments can be utilized. Color bursts or random color generating encapsulating pigmented injection molding and extrusion master batch materials can be generated by particle size, dispersion capabilities of the carrier during melting and in process and the like.

Non-microencapsulated and micro-encapsulated thermochromic additives can be added to product substrate compositions from between 0.01% to over 50% depending on the application and utility of the multi-element additive. Typically, the additive will be added from between 0.05% and 25% by weight to the product matrix. More often, the additive will be included from between 0.1% and 20% by weight. Most often, the additive will find use at between 1% and 10% by weight.

Photochromic Multi-Element Additives:

Photochromic materials of interest as multi-element additives can be either organic compounds, such as anils, disulfoxides, hydrazones, osazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Inks containing photochromic components could be used as a security ink, watermark or to create some other means for authenticating a document.

Examples of suitable photochromic materials include compounds that undergo heterolytic cleavage, such as spiropyrans and related compounds, and the like; compounds that undergo homolytic cleavage, such as bis-imidazole compounds, bis-tetraphenylpyrrole, hydrazine compounds, aryl disulfide compounds, and the like; compounds that undergo cis-trans isomerization, such as stilbene compounds, photoisomerizable azo compounds, and the like; compounds that undergo photochromic tautomerism, including those that undergo hydrogen transfer phototautomerism, those that undergo photochromic valence tautomerism, and the like; and others. Mixtures of two or more photochromic materials may be used together in any suitable ratio.

Specific examples of photochromic materials include spiropyrans such as spiro[2H-1-benzopyran-2,2'-indolines], spirooxazines such as spiro[indoline-2,3'-[3H]-naphtho[2,1-b]-1,4-oxazines], spirothiopyrans such as piro[2H-1-benzothiopyran-2,2'-indolines], stilbene compounds, aromatic azo compounds, bisimidazoles, hydrazines, aryl disulfides, and mixtures thereof may also be used, azo compounds that exhibit photochromism, bisimidazoles, benzo and naphthopyrans (chromenes) such as 3,3-diphenyl-3H-naphtho[2,1-b]pyran; 2-methyl-7,7-diphenyl-7H-pyrano-[2,3-g]-benzothyazole; 2,2'-spiroadamantylidene-2H-naphtho-[1,2-b] pyran, spirodihydroindolizines and related systems (tetrahydro- and hexahydroindolizine such as 4,5-dicarbomethoxy-3H-pyrazole-(3-spiro-9)-fluorene; 1'H-2',3'-6 tricarbomethoxy-spiro(fluorine-9-1'-pyrrolo[1,2-b]-pyridazine]; 1'H-2',3'-dicyano-7-methoxy-carbonyl-spiro [fluorine-9,1'-pyrrolo-[1,2-b]p-yridine, quinines such as 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene, perimidinespirocyclohexadienones such as 2,3-dihydro-2-spiro-4'-(2',6'-di-tert-butylcyclohexadien-2',5'-one)-perimidine; 1-methyl-2, 3-dihydro-2-spiro-4'-(2',6'-di-tert-butylcyclohexadien-2-',5'-one)-perimidine; 2,3-dihydro-2-spiro-4'-[(4H)-2'-tert-butylnaphthalen-1'-one]perimidine; 5,7,9-trimethyl-2,3-dihydro-2-spiro-4'-(2',6'-di-tert-butylcyclohexadien-2',5'-one)-pyrido-[4,3,2, d,e]quinazoline, perimidinespirocyclohexadienones, photochromic viologens such as N,N'-dimethyl-4,4'-bipyridinium dichloride; N,N'-diethyl-4,4'-bipyridinium dibromide; N-phenyl, N'-methyl-4,4,-bipyridinium dichloride, fulgides and fulgimides such as -(p-methoxyphenyl)-ethylidene (isopropylidene) succinic anhydride; 2-[1-(2,5-dimethyl-3-furyl)-2-methylpropylidene]-3-isopropylidene succinic anhydride; (1,2-dimethyl-4-isopropyl-5-phenyl)-3-pyrryl ethylidene (isopropylidene) succinic anhydride, diarylethenes such as 1,2-bis-(2,4-dimethylthiophen-3-yl) perfluorocyclopentene; 1,2-bis-(3,5-dimethylthiophen-3-yl) perfluorocyclopentene; and 1,2-bis-(2,4-diphenylthiophen-3-yl) perfluorocyclopentene, triarylmethanes, Anils and related compounds, and hydrazines. Also suitable are compounds that exhibit tautomeric photochromic phenomena. Examples of these materials include those that undergo photochromic valence tautomerism, those that undergo hydrogen transfer, including keto-enol phototautomerism, aci-nitro phototautomerism, and those that undergo other forms of phototautomerism, such as the naphthacenequinones and their substituted derivatives, as well as polymers containing these moieties, which undergo photochromic transformation between the trans and ana forms, for example as described in, for example, F. Buchholtz et al., Macromolecules, vol. 26, p. 906 (1993), the disclosure of which is totally incorporated herein by reference. Mixtures of any of the foregoing photochromic materials may also be used.

In addition, mineral photochromic compounds can be selected and utilized from the metal oxides, hydrates of said oxides and their complexes such as those described in the patents U.S. Pat. No. 5,989,573 and EP-B1-0,359,909 and in particular the oxides of titanium, niobium, silicon, aluminum, zinc, hafnium, thorium, tin, thallium, zirconium, beryllium, cobalt, calcium, magnesium, iron and their mixtures. Of these metal oxides, particular mention may be made of the oxides of titanium, aluminum, zinc, zirconium, calcium, magnesium, silicon and iron. The oxides and oxide hydrates of titanium, aluminum, zinc, zirconium, calcium and magnesium are preferred. Even more preferably use should be made of titanium dioxide which can be made photochromic with the aid of a metal selected from iron, chromium, copper, nickel, manganese, cobalt, molybdenum as such or in the form of a salt such as a sulfate, chlorate, nitrate, acetate.

In embodiments, the photochromic materials do not decompose at the operating temperatures of the production process and are compatible with (that is, dissolve or disperse uniformly in) the selected product substrate.

Non-microencapsulated and micro-encapsulated photochromic additives can be added to product substrate compositions from between 0.01% to over 50% depending on the application and utility of the multi-element additive. Typically, the additive will be added from between 0.05% and 25% by weight to the product matrix. More often, the additive will be included from between 0.1% and 20% by weight. Most often, the additive will find use at between 1% and 10% by weight.

Luminescent, glow-in-the dark, security, pearlescent, pigments visible only under UV light, or fluorescent pigments can be used in conjunction with other additive compositions. Non-visible spectrum fluorescent dyes can be obscured by an one color of a diacetylenic composition or other thermochromic dye such that when a temperature triggering event occurs, the fluorescent signal becomes visible when utilizing the corresponding wavelength to reveal the fluorescent dye composition.

Pearlescent or nacreous pigments have become popular in the creation of luster effects in coatings. This has enabled the generation of new and unique color effects for automotive, industrial, cosmetic and pharmaceutical applications. The pearlescent effect is produced by the spectral of light from the many surfaces of the platelets with parallel orientation at various depths within the coating. Light striking the platelets is partially reflected and partially transmitted through the platelets. A pearly luster effect is produced by the dependence of reflection on viewing angle, and the sense of depth is created by reflection from many layers. The platelets must be extremely smooth to maximize reflected light, and any surface roughness diminishes the lustrous effect. Non-fine particles or pigments with rough edges can also negatively affect the lustrous appearance in products.

Fluorescence is the emission of light by a substance that has absorbed light or other electromagnetic radiation of a different wavelength. It is a form of luminescence. In most cases, emitted light has a longer wavelength, and therefore lower energy, than the absorbed radiation. However, when the absorbed electromagnetic radiation is intense, it is possible for one electron to absorb two photons; this two-photon absorption can lead to emission of radiation having a shorter wavelength than the absorbed radiation. Fluorescent pigments and dyes can be added as powders, master batch pellets, pseudo master batch, and liquid master batch or like. Typically, fluorescent pigments and dyes will be added in combination with thermochromic, laser marking, or photochromic additives.

Non-microencapsulated and micro-encapsulated fluorescent additives can be added to product substrate compositions from between 0.01% to over 90% depending on the application and utility of the multi-element additive. Typically, the additive will be added from between 0.05% and 50% by weight to the product matrix. More often, the additive will be included from between 0.1% and 25% by weight. Most often, the additive will find use at between 1% and 10% by weight.

Pigments, additives, augmenting agents, colorants, and related compositions described can added in powered forms, added in master batch forms, added as dry pseudo master batch forms, liquid master batch forms or the like. The method or choice of addition depends on the process utilized for production and the best method for additive introduction. Pelleted master batch find use with conventional extrusion and injection molding processes. Liquid master batch forms can be utilized with continuous addition processes typically used for plastics extrusion. Powdered forms can find use where equipment can be modified to accommodate fines and powder density.

Low-Cost Addition Means:

Of particular interest are low-cost addition means that are practical for various production processes. Below, we describe a novel pseudo master batch composition-approach that we developed be generally used as a cost reduction and performance enhancing method for introducing more expensive additive forms. Pseudo master batch formulations can be utilized to reduce additive addition cost from 5% up to 70% compared to standard pelleted master batch compositions. More usually, we have found cost reductions in the range from 10% to 50%.

Pseudo master batch production enables lower cost aqueous slurry-based additives such a newly formed thermochromic or photochromic micro-encapsulated color change compositions to rapidly be converted into a convenient to use plastic-based composition. Preparation of pseudo master batch begins with mixing an aqueous slurry comprising an additive of interest with a cationic, non-ionic, or anionic plastic emulsifier and a powdered plastic resin. The mixture is thoroughly mixed and completely flash dried into a powder, granular form, flake form, or particulate form depending on the application of interest. Dried pseudo master batch materials eliminates the need to further extrude and pelletized additives.

Novel Printing Approaches for Discrete Color/Pattern Development:

Inkjet printing, drop-on-demand printing, continuous inkjet printing, multi-color flexographic printing and the like can be utilized to selectively print one or more of a color former, sensitizer, augmenting agent, or color developer composition. Amounts of one or the other component or another can be selectively printed whereby generating image development processes in novel formats.

Graphics and Messaging:

Messages, symbols, illustrations, titles, graphics, text, text messages, messages in general, images, icons, licensed figures, numerical values, hidden messages, line art, detailed art, multi-colored images, embedded graphics, graphic elements or entire graphics, visual que's, obscured images, partial images, pricing information, security information, promotional information, safety information, marks, patterns, and the like can be combined with time and time-temperature color development processes and compositions described above.

Graphic and messaging information can be printed with stationary inks above or below the time and time-temperature development compositions. Graphic and messaging information can be printed with time and time-temperature inks and combined with stationary graphics and messages. Likewise, both stationary and time-temperature inks can be combined in unique ways to generate messages that appear and disappear.

Graphic overlay patterns can be employed whereby the graphic overlay obscures and a color developing graphic or message comprised of the time or time temperature ink composition. As the time or time temperature ink develops in the initial stages, it is obscured by the stationary graphic overlay pattern until development proceeds to an intensity that the developing ink becomes discernable through the graphic overlay pattern.

Alternatively, a developing graphic or image comprising the developing ink can be printed in a trapped pattern that is compatible or continuous with the developing ink. Initially, the message is apparent. As the developing ink continues to develop, it will become similar in pattern, hue, and intensity with the stationary graphic. At a pre-described time or time-temperature profile, the developing pattern color and pattern matches the stationary pattern and becomes indiscernible against the background and the message or graphic appears to disappear.

A wide range of graphic and messaging formats can be utilized to emphasize, obscure, confuse, re-register, change, morph, transition, alter, become apparent, alter, integrate or the like to achieve a desired result that best suit the readout or resulting effect intended for a particular product application of interest. Examples stated above are cited by way of emphasizing a wide range of options, but not intended as limitations.

Machine-Readable Chemistries and Device Configurations:

In certain embodiments, indicator compositions of the invention find use in machine-readable applications. Machine-readable chemistry and device configurations can include, but are not limited to, various printed barcodes, Interactive barcodes, abuse security barcodes; 1D, 2D, and 3D; barcodes holographic barcodes, vision imaging systems, transient barcodes, time-only barcodes, freshness indicating barcodes, shape memory bar codes, and a variety of other applications and formats.

Compositions herein can be formulated and utilized in a variety of visual, scanning, imaging, and machine readable processes as they relate to temperature monitoring algorithms. Messages or codes can be made to appear or disappear; parts or elements of graphics, symbols or codes can be utilized to make the element, graphic, or code un-discernable or unrecognizable until that portion of the medium has changed with temperature or the like.

Injection Molding and Co-Injection Molding:

Injection molded and co-injection molded temperature indicating/optical change cooking sensors can be prepared using thermochromic colorant can be added directly or indirectly to the article molding resin. Thermochromic colorants can be added as powders, liquid master batch compositions, or plastic pelleted master batch. Thermochromic colorants can be derived from a variety of chemistry classes including leuco dyes, single chain polydiacetylenic compounds, dual chain bis-amide polydiacetylenic compounds, inorganic color change pigments, color shifting fluorescent dyes and pigments, natural color change dyes, glow-in-the-dark colorants and the like.

We have enabled a disposable cooking thermometer that is fully injection molded with our high temperature colorant. Since the molded part includes the full thermal mass of plastic, the color indicating hold time is now longer than 5 seconds. Secondly, the tip provides for full thermal profiling throughout the cross section of a meat product. If any part of the tip is not fully color change, then cooking is not complete. Cooking is only complete when the tip has fully and brightly changed color.

To further simplify production, disposable and re-usable thermometers can be injection molded to include embossed logos. This will eliminate the need to screen print logos etc. We anticipate volume pricing to be at or below prior pricing estimates. We also anticipate that the part may have enhanced performance over current parts due the profiling potential.

Plastic Extrusion and Co-Extrusion:

For straw manufacturing, we typically utilized plastics extrusion processes that are high volume manufacturing processes in which raw plastic material is melted and formed into a continuous profile. Extrusion produces items such as pipe/tubing, weather stripping, fence, deck railing, window frames, adhesive tape and wire insulation. Extruded tubing process, such as drinking straws and medical tubing, is manufactured the same as a regular extrusion process up until the die. Hollow sections are usually extruded by placing a pin or mandrel inside of the die, and in most cases positive pressure is applied to the internal cavities through the pin.

Tubing with multiple lumens (holes) must be made for specialty applications. For these applications, the tooling is made by placing more than one pin in the center of the die, to produce the number of lumens necessary. In most cases, these pins are supplied with air pressure from different sources. In this way, the individual lumen sizes can be adjusted by adjusting the pressure to the individual pins.

Coextrusion is the extrusion of multiple layers of material simultaneously. This type of extrusion utilizes two or more extruders to melt and deliver a steady volumetric throughput of different viscous plastics to a single extrusion head (die) which will extrude the materials in the desired form. This technology is used on any of the processes described above (blown film, overjacketing, tubing, sheet). The layer thicknesses are controlled by the relative speeds and sizes of the individual extruders delivering the materials.

There are a variety of reasons a manufacturer may choose coextrusion over single layer extrusion. One example is in the vinyl fencing industry, where coextrusion is used to tailor the layers based on whether they are exposed to the weather or not. Usually a thin layer of compound that contains expensive weather resistant additives are extruded on the outside while the inside has an additive package that is more suited for impact resistance and structural performance.

Lateral and Capillary Flow Effects:

Lateral or vertical time/diffusion controlled color development in porous substrates or on capillaries along or imbedded in the consumable product can be used in combination with solvent (water or other) soluble inks and FD&C dyes such that solvent/water contact and supply at one part of the substrate visibly alters dye printed information on the substrate.

A unique enablement of the invention is that the fluid/solvent is the composition being time tested at the point of opening or filling the container with said fluid/solvent. Alternative prior art utilizes pre-fluid filled reservoirs that need to be pre-filled and sealed. The invention disclose herein uniquely utilizes the fluid/solvent as the external activating means rather than utilizing an on-board enclosed fluid.

Importantly, time can be modulated by diffusion substrate type, effector agents that may comprise or be added to the substrate, fluid viscosity and composition, compression and density of the substrate, the capillary nature of the substrate, hydrophobicity and hydrophilicity of the substrate, blocking agents, fluid path and geometries in the substrate, substrate thickness and the like.

Retention factor Rf for dyes can be utilized as a means for controlling lateral diffusion on the printed substrate. Substrates and/or dye compositions can be modified alone or in conjunction with each other in order to modulate retention of dyes migrating in a lateral flow membrane configuration.

Nano tubes, dyes, colloidal gold, pigments, polymers, colorants, optical agents, luminescent pigments, thermochromic pigments, natural food dyes, synthetic dyes, dye complexes, micro-particles, encapsulated dyes, biologic dyes and conjugates, and the like can be used as optical agents in the lateral diffusion process. Messages, wording, graphics, symbols, lines, marks, arrows, numbers and the like can be covered and revealed, displaced, erased, moved, covered, eliminated, confused, color changed or the like.

Plastic Compositions:

Product compositions described herein may include an "elastomeric component" to improve flexibility and functionality compared with native substrate compositions. The term "elastomeric component" refers to any number of various thermal plastic elastomers (TPE's); such as, but not limited to polyisoprene, polybutadiene, polyisobutylene, polyurethane, polychloroprene, highly elastic silicone, DYNAFLEX, VERSAFLEX, VERSALLOY, VERSOLLAN, and KRATON (GLS Corporation, Ill.). SANTOPRENE brand thermoplastic vulcanizates (TPVs) are a series of high-performance elastomers which combine the desirable characteristics of vulcanized rubber, such as flexibility and low compression set, with the processing ease of thermoplastics. Fitting into the mid-range performance spectrum of both thermoplastic and thermoset rubbers, SANTOPRENE TPV (Exxon Mobile Corp.) is accepted for a broad range of industrial and consumer product applications for the consumables products presented here.

Other plastics that may be added in ratios during manufacture include but are not limited to ethylenechlorotrifluoreethylene (ECTFE), ethylentetrafluorethylene (ETFE), polinvinylidene fluoride (PVDF), ethylene-propylene rubber (EPR), silicone rubber (SI), ALCRYN thermoplastic rubber (TPR), HT thermoplastic rubber (HTPR), SANTOPRENE thermoplastic rubber (TPR), LSOH crosslinked compounds, LSOH thermoplastic compounds, methylvinyletherfluoralkoxy (MFA), perfluoroalkoxy (PFA), thermoplastic polyester elastomer (TPE), polyimide (KAPTON), polyurethane (PUR), polyvinyl chloride 105° C. (PVC), polyvinyl chloride 70° C. (PVC), low temperature polyvinyl chloride (LTPVC), oil resistant Polyvinyl chloride (OR PVC), semi-rigid polyvinyl (SR PVC), polyvinyl chloride polyurethane (PVC PUR), and the like. Additive plastics can be utilized to adjust the characteristics of the base thermo plastic elastomer.

Shape/memory materials with intrinsic optical properties can exhibit a plurality of shape/memory changes combined with single or multiple optical effects including but are not limited to thermochromic, photochromic, combined tactochromic and thermochromic effects, combined holographic and thermochromic effects, combined thermochromic and photochromic effects, combined photo-luminescent and thermochromic effects, various combined thermochromic effects such as liquid crystal effects and intrinsic color change effects from polydiacetylenes or alternative thermochromic materials, mechanochromic and thermochromic effects, pH sensitive color changes alone or in combination with other optical effects, and an assortment of related combined optical effects which exhibit synergy with the shape/memory change process. Particle additives of a variety of shapes and sizes can be combined with the shape/memory material to create attractive and interesting visual affects during the shaping, deformation, reshaping or shape memory process.

Depending on the shape/memory material composition and associated optical/change composition employed, it may be desirable to ensure the comprising composition does not stick or adversely adhere to itself during use. Lubricating agents or surfactants can be employed to facilitate non-stick or adherence properties.

Shape/memory material can be purchased from vendors such as BASF, DuPont, Bay Materials or the like. Shape/memory materials may also comprise polyethylene and/or polypropylene. Composites can be made with shape/memory plastics, vinyl, high and low impact plastics exotic polymers used for various industrial applications, epoxy resins where various ratios between the epoxy and hardener can be utilized, metals and metal alloys, bi-metal materials used in thermometers, comprised with components including rubbers, silicon-based materials, certain ceramic materials, pressure sensitive material, stampable materials, biologically compatible materials, carbohydrate based materials, organic lipophilic materials, waxes, biologically active materials, certain tissues such as muscle, skin or hair, bio-absorbable materials, glass compositions, ingestible materials, resins, epoxy-based composites and resins, glue and adhesive compositions, polyurethanes and derivatives (Mitsubishi Heavy Industries, Japan), shape memory alloys, shape-memory plastics (mnemoScience, Aachen, Germany), oligo-dimethacrylate, n-butylacrylate and related polymeric plastics, thermoplastic elastomers, networking polymeric systems, classes of polyesters, polymers based on monomers comprised with L,L-dilactide, diglycolide, and p-dioxanone, thermoplastic multi-blockco-polymers, macrodiols, homopolymers of lactide or glycolide compositions, or copolymers of lactide and glycolide groups, chiral and non-chiral polymers, polyvinyl chloride compositions, polyethylene terephthalate and analogs, and related materials possessing shape/memory characteristics.

Organic polymeric groups can range in molecular weight from less than about 1000 g/mol to more than about 10,000,000 g/mol. The shape/memory plastic selected, polymer composition and degree of polymerization will depend on the application of interest. The shape changing material may also comprise a composition which reversibly changes from one configuration to another and back again, irreversibly changes from one configuration to another and remains in its final shape, or can be formulated to possess intrinsic abilities to undergo various permutations with and without having memory of its initial or final configuration.

The absolute shape/memory change setting will depend on the product application of interest. For example products may be prepared which change color and shape/color when warmed to about 100° F. At room temperature or below, the product will have a solid plastic-like feel. The color or hue can be adjusted to correspond to a desired visual attractiveness for the product. When the product is touched, or exposed to temperatures near body temperatures (e.g., 75-90° F.) the corresponding color and shape will begin to change. The plastic embodiment will become softened and begin to deform. Likewise, the thermochromic material comprising the composition along with the shape/memory plastic will visually change color corresponding to the rise in temperature. When completely warmed above the softening temperature of the shape/memory material, the product will be completely deformed to whatever configuration desired. When chilled back to room temperature or below, the plastic shape/color change embodiment will harden into its deformed configuration.

Temperature changes can be introduced with water, air, electrically conductive circuits, heat lamps, radiating heat sources, microwave heating where the shape/memory material has a microwave reactive component present, frictional heat induction, chemically induced heating, laser optically induced heating, semiconductor laser optically induced heating, resistive heating elements, Peltier plate induced heating, fluid circulating heating sources, solar heating, directed or open flames, burning rocket propellant, various forms of contact and conductive heating, heating body contact and the like.

Reversible and irreversible versions of the color change agent can be employed depending on the desired embodiment of interest. Reversible agents can be employed where it is desirable to have a multi-use effect or reuse the color change effect. For example, consumable products with continued and repeated use value will find use of a reversible color change component comprising the final embodiment. In this case it would be desirable to utilize a reversible thermochromic or luminescent material which can be repeated during usage. In another example, it may be desirable to record a single color change permanently. In this case, it would be desirable to utilize a thermochromically irreversible material which changes from one color to another giving rise to a permanent massage.

Shapes can be made to change slowly or with rapid response time by adding relief layer composites, embedded springs, flexible stays, or relief additives. The relief layer or additive acts to accentuate a shape/memory effect. For example, a stiffened plastic thread can be coated with a shape memory material whereby the coating will be moldable at a temperature setting. Once molded and chilled to set the desired shape, the fixed shape strand will hold its configuration until it is warmed above the softening temperature of embodied composition. The softened shape/memory material will permit the stiffened plastic thread to resume its original structure and extend to its original position.

The shape/memory material and associated relief layer material can be formulated with 95% relief material to 5% shape/memory material. More usually, they are formulated with 50% relief material and 50% shape/memory material. Typically the shape/memory material will comprise from about 60 to 100% of the composition. The exact ratio of shape/memory material to relief material will depend on the desired final property of the embodiment or application of interest. The configuration, shape/memory composition, relief composition, and method for adjoining each component should be considered when designing the final embodiment.

The shape/memory/optical material can be comprised of an elastomeric material such that the elastic properties of the elastomer can be utilized to create spring or rubber band-like function. An associated elastomer can be stretched along with the entire comprising composition above the softening temperature of the shape/memory material. A shape can be enforced once the composition is made stiff at below the softening temperature of the shape/memory/optical material. Upon elevating the temperature of the composition above the softening and/or optical change transition temperature, the entire composition will respond elastically to its original configuration and optically visual appearance.

The shape/memory/optical material can be comprised as above with a flexible metal or plastic spring such that the spring will facilitate the conformational changes that the plural intrinsic composite undergoes. Any of a variety of other flexible, semi-rigid, elastomeric, load bearing, torsion bearing, friction bearing, or related materials can be employed as a facilitating means to impose initial and final conformations on the plural intrinsic shape/memory/optical change composition. By way of example, a sponge-like foam can be coated or contained within the shell of a shape/memory/optical change material such that a shape can be imposed and solidified by heating and cooling in an intended shape. Subsequent heating and softening will cause reformation to the initial molded shape assisted by the spring action from the entrapped foam lattice.

The shape/memory and/or color change materials will comprise from 0.01% t0 100% of the lid embodiment. More usually, the shape/memory and/or color change materials will comprise from 0.1 to 100% and typically comprise from 1% to 100%.

In a further embodiment, a consumables product may include localized portions of the shape/memory and/or color change comprising material such that hinges, localized deformations, bends, protrusions, bulges, patterns, designs, extensions, and the like can be effected whereas the remaining portion of the final embodiment is unaffected by the shape/memory and/or color change process. Electrically conductive heating elements can be employed where conductive and/or resistive heating inks are printed into various or specific patterns to achieve a desired localized or patterned heating location on the embodiment.

In addition, plural compositions have applications for use with the consumables products and systems disclosed herein. By "plural composition" is meant a composition that incorporates thermal switching/responsive material in combination with a color-shift reporting element. Such a pleural composition would incorporate various intrinsic capabilities, including changing its physical properties, such as solid to liquid phase transition, viscosity, hardness, and related physical parameters, as well as changing its visual color, such as color hue, color density, opacity, and related optical characteristics.

Shape memory materials can be used in combination with laser light absorbing components such as antimony-tin oxide, aluminum powder or other related energy absorbing metals or compounds. The combination of which provides a convenient means of utilizing laser induced energies to cause chemical and physical expansion in the discrete locations of beam exposure. Exposure at selected locations can be utilized to raise images, create a 3-D writing effect, induce surface relief structures and the like.

Detector Component—UV-Initiated Reversible and Irreversible:

The detector component of the products presented herein may contain additives that display UV-initiated reversible color changes to indicate storage time, for example. Colloidal diacetylene compositions are readily polymerized using thermal polymerization and UV photopolymerization. The resulting polymer remains very stable in a broad range of organic and aqueous solvents. The thermochromic temperature transition may show robust thermochromic reversibility in a wide variety of solvent systems including harsh organic solvents such hexane, chloroform, acetone, ethanol and the like. The thermochromic transition is dictated by the fatty acid chain link. Chain links form C8 fatty acids through C40 fatty acids with a diacetylene moiety which may be synthesized, dymerized and polymerized. Thermochromic transitions may be obtained with pure dymerized Polydiacetylene polymers as well as plural compositions where the diacetylene polymer has been mixed with a thermally responsive composition such as paraffin, waxes, block co-polymers, plastics, silicon rubbers and the like.

Multi-Element Performance Meat Packaging Trays:

Performance meat—sausage trays combine multiple elements to enhance performance, utility, functionality, cost reduction, shipping compatibility, process simplification, and environmental compatibility. Two or more multi-elements can be combined to generate enabling end-product feature and function of interest.

- Highly close stacked compared to conventional meat and sausage trays
- Easy to unstuck during usage and after close packing during transportation
- Quad ribbed for strength and placement of meat pieces or sausages
- Bowed rib construct for sausage shape support
- Surface profile for high surface contact and contoured for fast flash freezing
- Landfill degradable composition for rapid breakdown
- High-speed marked for promotion, communication, and coding
- Striped with thermochromic composition for cold holding or other indications
- Polypropylene for sustainability and recycling
- Silica additive for plastic and cost reduction Multi-Element Tactile, Insulating, Sensing Inks:

Multi-element inks have the advantage over inks standard to the printing industry in that they can provide the products with new capabilities and properties including, but not limited to: hot insulating, cold insulating, color change, tactile feel, gripping characteristics, embossed appearances, 3-D visual effects, and related features. Multi-element inks can be utilized in combination with standard flexograpic, screen, printing pad printing and other commonly used printing processes.

- Multi-element inks with properties including: tactile feel, 3D expansion imaging, color change, insulation and product protection, shape memory, and visual/dynamic features.
- Reversible and irreversible color change chemistries that both sense and respond visually to temperature, light, or other relevant stimulus.
- Print resolutions can be adjusted for specific applications depending requirements. Small to large elements can be imaged from sub centimeter to page sizes. The system can be readily scaled for short run purposes or intermediate a high volume applications.
- Ink compositions can be formulated and/or devices can to be constructed to meet specific user requirements including high resolution, compatibility with various surfaces including papers, plastics (PE, PP, PS, PLA, EVA, SAN etc.), metals, glass films, wood, coated surfaces and other commercially relevant substrates.
- The intrinsic color composition can be formulated as a printable ink for visual identification, graphic coding, and visual formats in label form or direct on packaging depending of product requirements and amenable manufacturing processes.
- Compositions can be printed using flexo-graphic printing, drop-on-demand printing, conventional inkjet printing, coating/processing, screen-printing,
- Example printing geometries can include planar non-embossed, embossed, and de-bossed formats. Print and graphic selective embossing can be accomplished.
- Compositions can be formulated to be compatible with a variety of low to high-speed processes from 100 pieces/min to line speeds over 400 feet/minute on commercial presses.
- Pricing and label costs can range from the $0.04 EU sub $0.01 EU depending on articles, compositions, substrates, printing processes and the like. We focus on highly affordable and reasonable print options for on-going production volumes and applications.
- Chemistries have thus far been demonstrated to be non-toxic as determined by certified and internationally recognized standards and testing laboratories. Certain of our products can be formulated and processed satisfy regulatory bodies and requirements including EU REACH, Proposition 65, USDA, ASTM, and the FDA.

Multi-Element Profiled Extrusion Shapes:

Triangular organized straws pack more densely compared with circular hexagonally packed straws. Other fun profiles are also possible. Profiled straws have significant application to regional, promotional, advertising, and seasonal applications for fast food service. Seasonal profiles can be used for holidays and events. Complex profiles as well as simple shapes such as hearts, diamonds, squares, egg-ovals, rectangles, moon shapes, lip shapes, are near term. More complex tree-shapes, star shapes, figures, shamrock shaped, leaf shaped, face shaped, ear-shaped, letter shaped, number shaped, symbol shaped and the like are also possible. Of additional importance is to combine striping and co-extrusion to create colored effects e.g. a green Christmas tree with a brown trunk.

Storage Systems: Delivery of Preserving Material or Additives:

Food, perishable, or ingestibles storage systems or components for use with the products presented herein can also be designed to have a feature that delivers a set amount of a preserving material or agent into the food, perishable, or ingestible. Delivery of the preserving material or agent can benefit the storage process by physically or chemically enhancing the storage conditions.

The following examples are offered by way of illustration and not by way of limitation.

EXAMPLES

1. Low Temperature Color Change Laser Marked Straws

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Figure 1B:
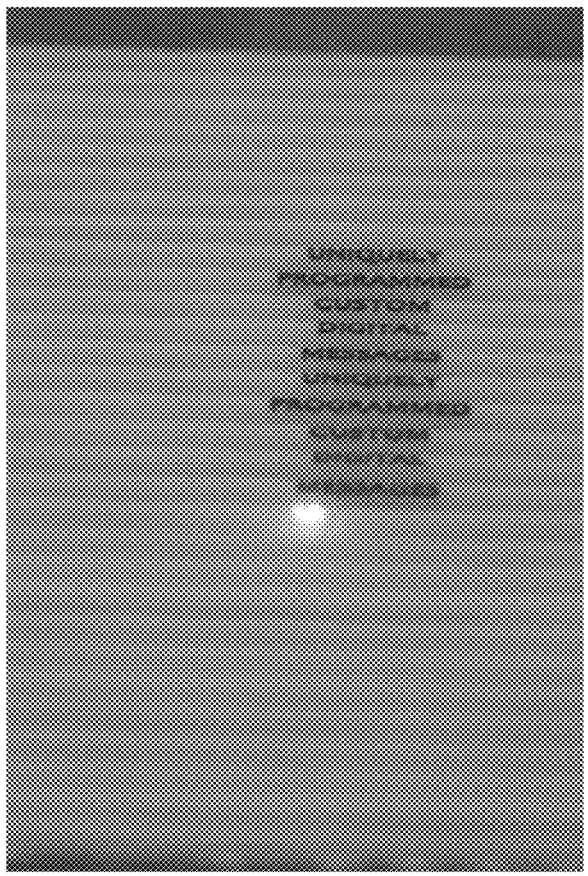

Straws were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. See FIG. 1.

2. Color Change Laser Marked Striped Straws

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Stripes were co-extruded on straw walls using a triple extrusion system: a main core-extruder equipped with two side extruders. Polypropylene stripe compositions were prepared with standard pelleted master batch as above, but without color change composition added. Standard polypropylene colorants including yellow and red (PolyOne) was added at between 3% by weight to the polypropylene stripe resin at 97% (BASF-YPC F401) to either side extruder. Stripe width and thickness were maintained during the extrusion process to ensure wall thickness and profiles met product specifications.

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Figure 2:
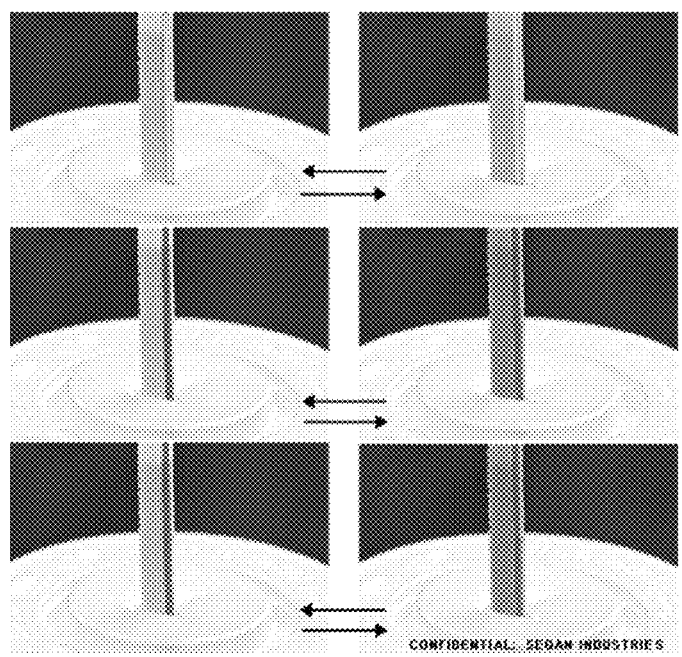
FIG. 2 provides pictures of straws that include color change strips and laser marked text imaging, according to certain embodiments of the invention.

Straws were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. FIG. 2 provides a photograph of straws produced as described above.

3. Elongated Color Change Laser Marked Tubular Straws

As in examples above straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard fluorescent colorant for background contrast and opacity (Food contact approved, Dayglo Inc. Cleve; and OH, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (1.0 cm dia.) was used to develop a circular profile. An extrusion puller was utilized to maintain speed and tube integrity as well as to feed a rotating cutter. Extrusion speeds were maintained at between 2-3 straws per second (24 inch cut lengths).

Straw diameters were maintained at from 0.1 inch in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Figure 3:
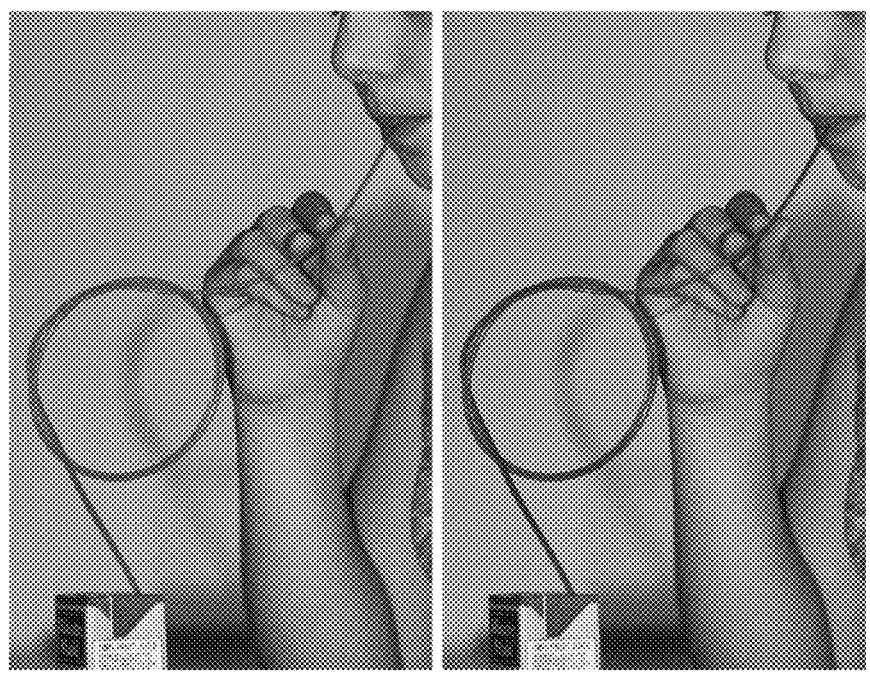
FIG. 3 provides a picture of an elongated straw that includes color change capability and laser marked text imaging, according to certain embodiments of the invention.

Straws were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. A picture showing the straws is provided in FIG. 3.

4. High Temperature Color Change Laser Marked Stir Stick and Straws

For straw manufacturing, 100 kg of a multi-element additive/master batch composition was prepared. 7% polypropylene pelleted color change master batch (Segan Industries, Inc., Burlingame Calif.) containing a 60° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color change at 60° C. in hot water.

Figure 4:
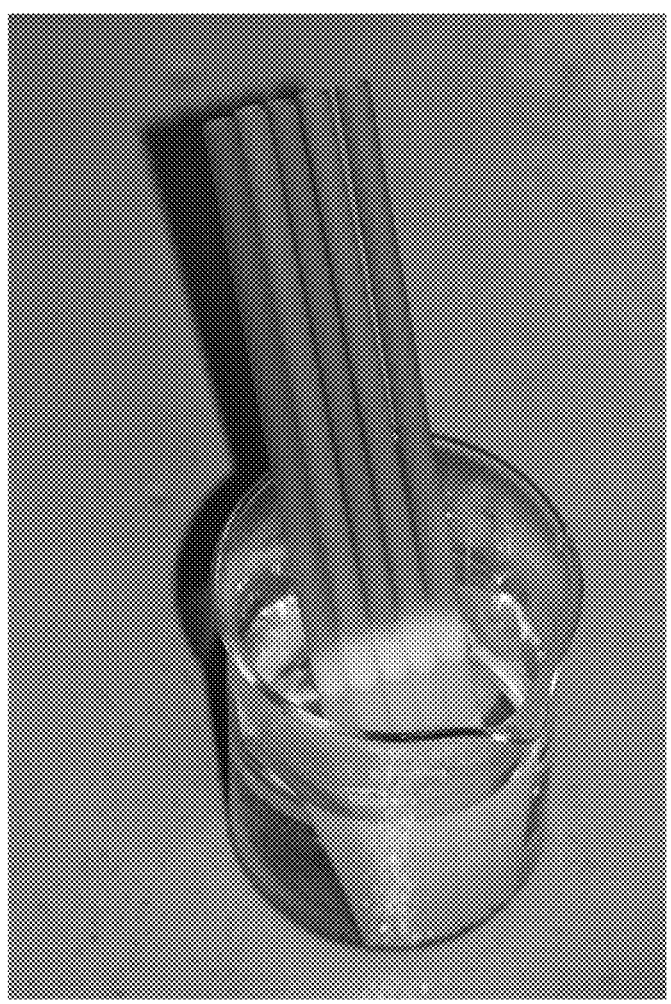
FIG. 4 provide a picture of straws that include both color change capabilities and laser marked text imaging, according to certain embodiments of the invention.

Straws were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. Pictures of the straws are provided in FIG. 4.

5. High Temperature Color Change Laser Marked Cooking Thermometers

For extruded cooking thermometer manufacturing, 100 kg of a multi-element additive/master batch composition was prepared. 7% polypropylene pelleted color change master batch (Segan Industries, Inc., Burlingame Calif.) containing a 60° C., 65° C., 70° C. or 75° C. clear to blue, green, or black or mixes thereof color change thermochrmomic was admixed with 2% pelleted laser marking additive (antimony-tin oxide), 1.0% standard orange/yellow colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A flat tube shaped extrusion dye (1.0 cm dia.) was used to develop a flat, but hollow profile. An extrusion puller was utilized to maintain speed and tube integrity as well as to feed a rotating cutter. Extrusion speeds were maintained at between 3-10 thermometers per second (4 inch cut lengths with diagonal bevel cut ends for sharpness).

Straw diameters were maintained at from 0.2 inch to 0.3 inches in width depending on the intended application. Thinner versions were utilized for ground meats and thicker stiffer versions were used for muscle cut meats and poultry. Disposable extruded and laser marked thermometers were successfully tested for color change at 60° C. in meats while cooking.

Figure 5:
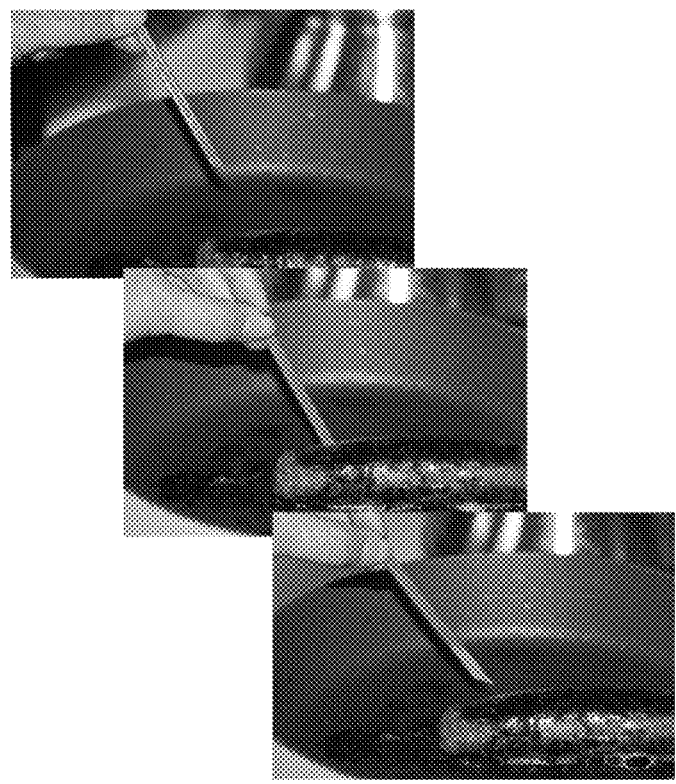
FIG. 5 provides pictures of cooking sticks that include color change capability and laser marked text imaging, according to certain embodiments of the invention.

Products were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. Pictures of the sticks are provided in FIG. 5.

6. Rainbow Effect Color Change Sipper Stir Sticks

For rainbow effect sipper stir stick manufacturing, 100 kg of a multi-element additive/master batch composition was prepared. 3.5% polypropylene pelleted low temperature color change master batch (Segan Industries, Inc., Burlingame Calif.) containing a 15° C. clear to blue, magenta, yellow, green, vermillian, red, purple, black or mixes thereof color change thermochrmomic was admixed with 3.5% polypropylene pelleted medium temperature color change master batch (Segan Industries, Inc., Burlingame Calif.) containing a compatible 22° C. clear to blue, magenta, yellow, green, vermillian, red, purple, black or mixes thereof color change thermochromic, 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Figure 6A:
FIGS. 6A and 6B provide views of rainbow straws according to embodiments of the invention.
Figure 6B:
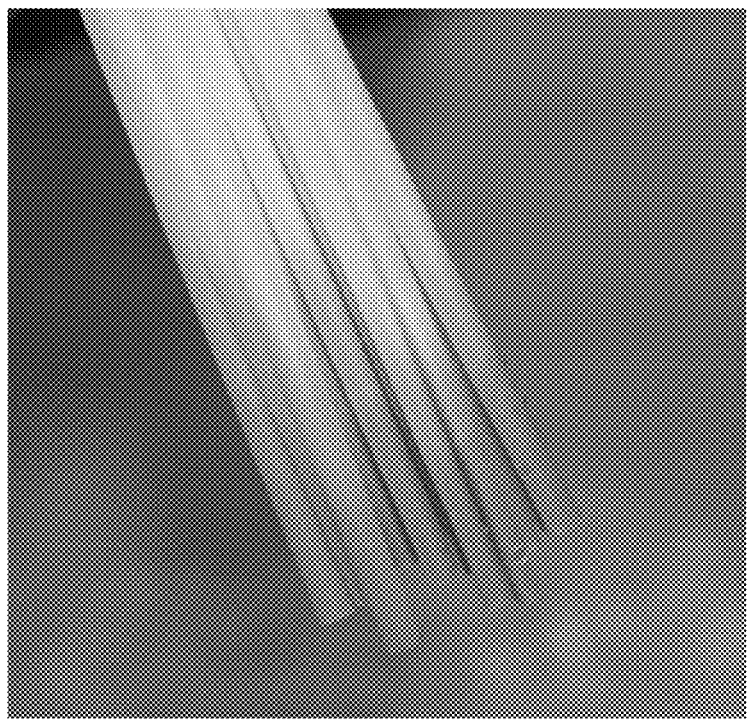

Sipper straw diameters were maintained at from 0.1 inch to 0.4 inches in diameter depending on the intended application. Thinner straws were utilized as sipper stirrers, midsized diameter straws were used as coffee stirrers straws, medium to wide straws were used for milkshakes and smoothies, and wide diameter straws were used for bubble tea and the like. Straws were successfully tested for color appearance at 15° C. in cold ice water as well as room temperature. Pictures of the straws are provided in FIGS. 6A and 6B.

7. Recyclable Color Change Straws Using Laser Marking Additive

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Figure 7:
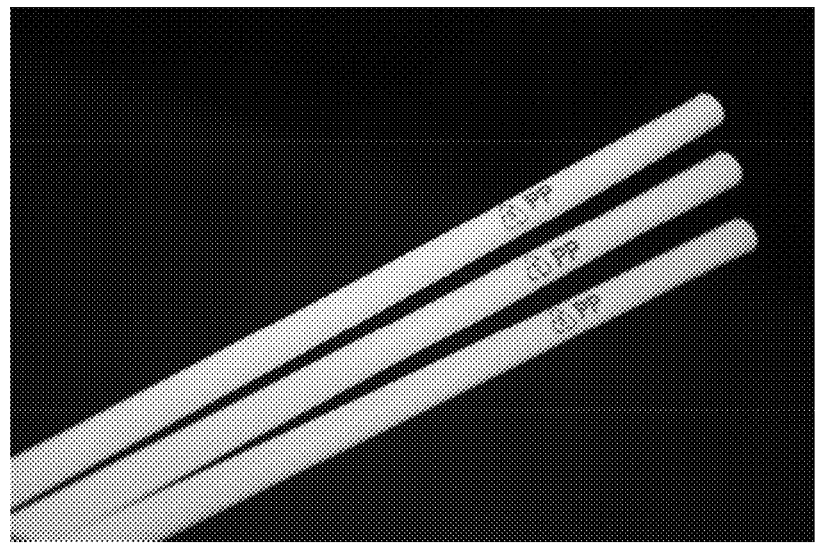
FIG. 7 provides a picture of recyclable straws according to an embodiment of the invention.
Figure 8:
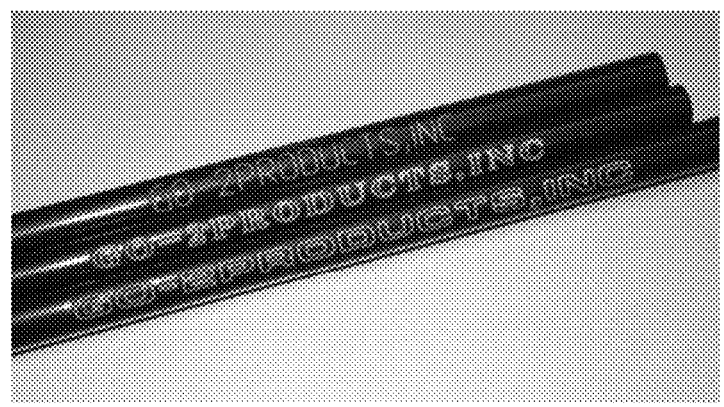
FIG. 8 provides a picture of straws having color change and laser ablated features according to an embodiment of the invention.

Straws were individually printed as recyclable number "6" "PP" (polypropylene) by further laser marking with a high-speed 50 watt YAG laser marking system (laser from Keystone Lasers, Nanjing China). Wording and graphics were also imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. Individually marked straws "6" "PP" (polyprpylene) were acceptable for recycling based on being marked whereas non-marked straws were not considered recyclable by recycling and curbside pickup. A picture of the straws is provided in FIG. 7.

8. Laser Ablated High-Speed Messaged Color Change Straws

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed 1.0% standard white colorant for background contrast and opacity (Clariant, West Chicago, Ill.), and 92% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Stripes or co-extruded outer layers for laser ablation were co-extruded on straw walls using a co-extrusion system: a main core-extruder equipped with two side extruders. Polypropylene stripe compositions were prepared with standard pelleted master batch as above, but without color change composition added. Standard black polypropylene colorants (PolyOne) was added at between 0.5% by weight to the polypropylene stripe resin at 99.5% (BASF-YPC F401) to either side extruder. Strip width and thickness were maintained during the extrusion process to ensure wall thickness and profiles met product specifications.

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Straws were individually printed laser marking with a high-speed 50 watt YAG laser marking system (laser from Keystone Lasers, Nanjing China). Wording and graphics were also imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. Individually marked digitally and with varying messages.

9. Recyclable Color Change Straws Using Laser Ablation

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Stripes for laser ablation and printing were co-extruded on straw walls using a triple extrusion system: a main core-extruder equipped with two side extruders. Polypropylene stripe compositions were prepared with standard pelleted master batch as above, but without color change composition added. Standard black polypropylene colorants (Poly-One) was added at between 0.5% by weight to the polypropylene stripe resin at 99.5% (BASF-YPC F401) to either side extruder. Strip width and thickness were maintained during the extrusion process to ensure wall thickness and profiles met product specifications.

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Figure 9:
FIG. 9 provides a picture of recyclable straws having color change and laser ablated features according to an embodiment of the invention.

Straws were individually printed as recyclable number "6" "PP" (polyprpylene) by further laser marking with a high-speed 50 watt YAG laser marking system (laser from Keystone Lasers, Nanjing China). Wording and graphics were also imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. Individually marked straws "6" "PP" (polypropylene) were acceptable for recycling based on being marked whereas non-marked straws were not considered recyclable by recycling and curbside pickup. A picture of the straws is provided in FIG. 9.

10. Landfill Degradable Color Change Laser Marked Straws

For straw manufacturing, 100 kg of a multi-element additive/master batch composition was prepared. 2% polypropylene pelleted landfill degradable additive master batch (Segan Industries, Inc., Burlingame Calif.) containing a bio-attractant additive admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Figure 10A:
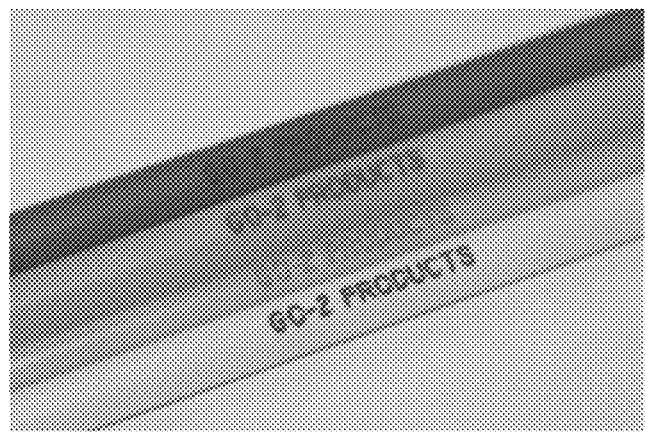
FIGS. 10A to 10C provides pictures of biodegradable straws having color change capabilities and laser produced marking at various stages of degradation according to an embodiment of the invention.
Figure 10B:
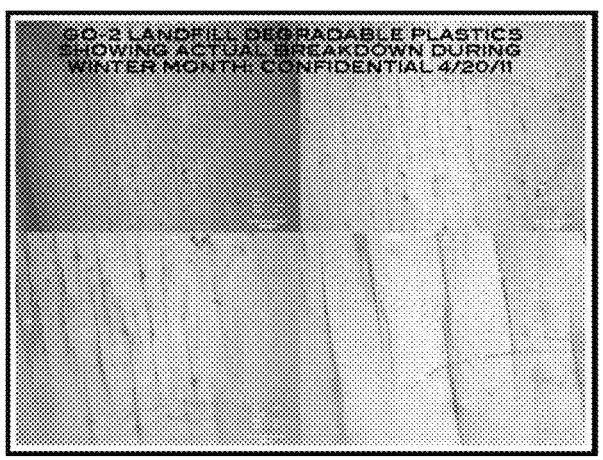
Figure 10C:

Straws were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use. Pictures of the straws at various stages of degradation are shown in FIGS. 10A to 10C.

11. Low Temperature Color Change Surface Textured Straws

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Figure 11:
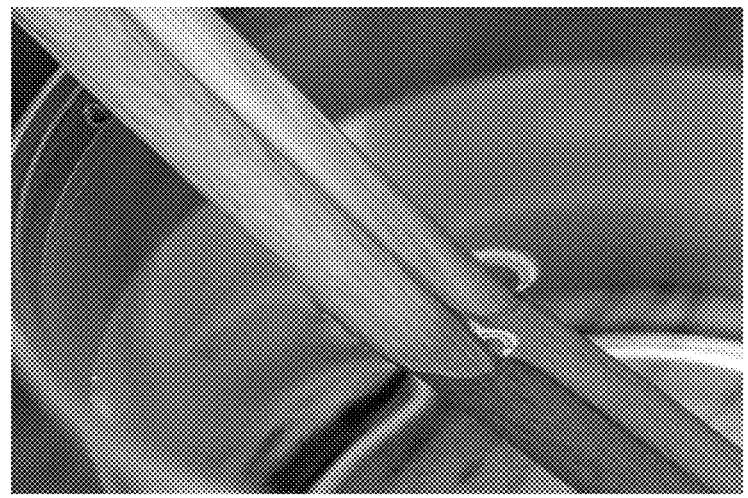
FIG. 11 provides a picture of color change surface textured straws according to an embodiment of the invention.

Straws were textured during extrusion by adding 0.01% to 0.1% water to the master batch resin combination during the extrusion process. The addition of water resulted in differential water out-gassing during extrusion resulting in a textured surface. The degree to which texturing is accomplished depend on the amount of water added. A picture of the straws is provided in FIG. 11.

12. Low Temperature Color Change Undulating Wall Thickness Straws

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter.

Extrusion speeds were maintained at between 3-10 straws per second (8 inch cut lengths).

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Figure 12:
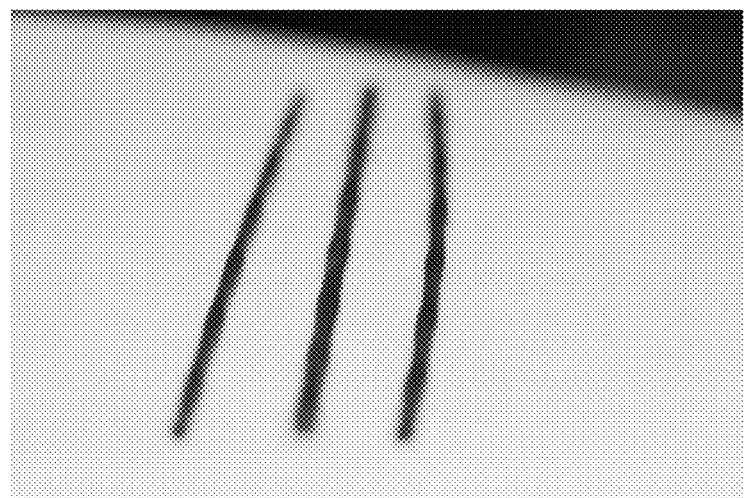
FIG. 12 provides a picture of color change undulating wall thickness straws according to an embodiment of the invention.

Straws were undulated in a repeat pattern during extrusion by adding inducing a harmonic oscillation during the extrusion process. The oscillation was induced by air flow resulted in differential wall thickness along the extruded tube. The degree to which differential straw thickness is accomplished depend on the amplitude and frequency during extrusion. A picture of the straws is shown in FIG. 12.

13. Low Temperature Color Change Equilateral Triangular Profiled Straws

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A triangular extrusion dye (1.0 cm per side.) was used to develop an equilateral triangular profiled straw. An extrusion puller was utilized to maintain speed and tube integrity as well as to feed a rotating cutter. Extrusion speeds were maintained at between 3-10 straws per second (8 inch cut lengths).

Figure 13:
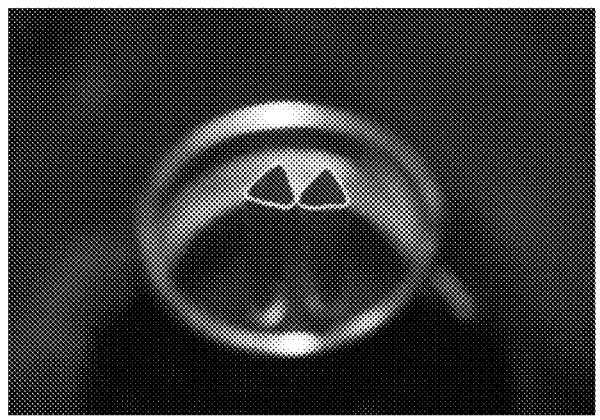
FIG. 13 provides a picture of triangular profile straws with color change, according to an embodiment of the invention.

Straw side dimensions were maintained at 0.2 inch per side. Other dimensions were also made from 0.2 inches to 0.4 inches per side. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water. A picture of the straws is shown in FIG. 13.

14. Color Change Stripes on Laser Marking Straws

For straw manufacturing, 100 kg of a multi-element additive/master batch composition was prepared. 99% extrusion grade polypropylene (BASF-YPC F401) was admixed with 2% pelleted laser marking additive (antimony-tin oxide), and 1.0% standard white colorant for background contrast and opacity (Clariant, West Chicago, Ill.). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Stripes were co-extruded on straw walls using a triple extrusion system: a main core-extruder equipped with two side extruders. Polypropylene stripe compositions were prepared with standard pelleted master batch as above, but without color change composition added. 12% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed 88% (BASF-YPC F401) to either side extruder. Strip width and thickness were maintained during the extrusion process to ensure wall thickness and profiles met product specifications.

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straw stripes were successfully tested for color appearance at 15° C. in cold ice water.

Figure 14:
FIG. 14 provides a picture of straws having color change stripes and laser markings, according to an embodiment of the invention.

Straws were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. A picture of the straws is provided in FIG. 14.

15. Low Temperature Color Change Metallochromic Laser Marked Straws

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 0.5% aluminum metal flake (100-500 micron flake size), and 90.5% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color and metallic appearance at 15° C. in cold ice water.

Figure 15:
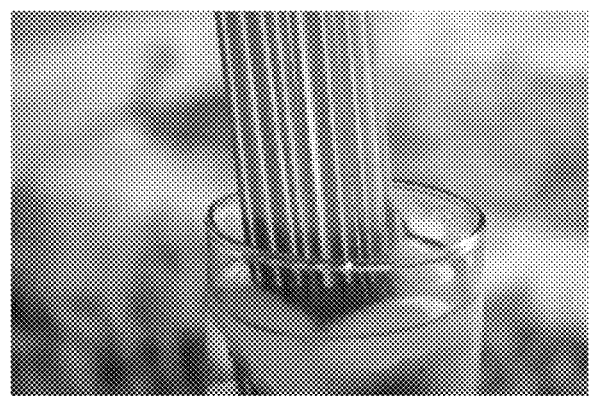
FIG. 15 provides a picture of straws having metallochromic color change and laser markings, according to an embodiment of the invention.

Straws were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. A picture of the straws is provided in FIG. 15.

16. Bar Coded Promotional Straws

For straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color appearance at 15° C. in cold ice water.

Figure 16:
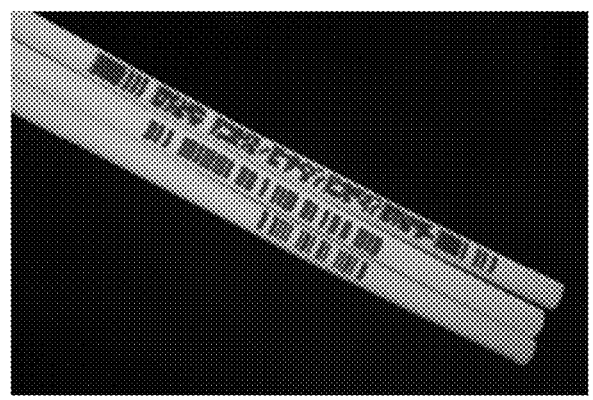
FIG. 16 provides a picture of straws having color change stripes and laser marked barcodes, according to an embodiment of the invention.
Figure 17:
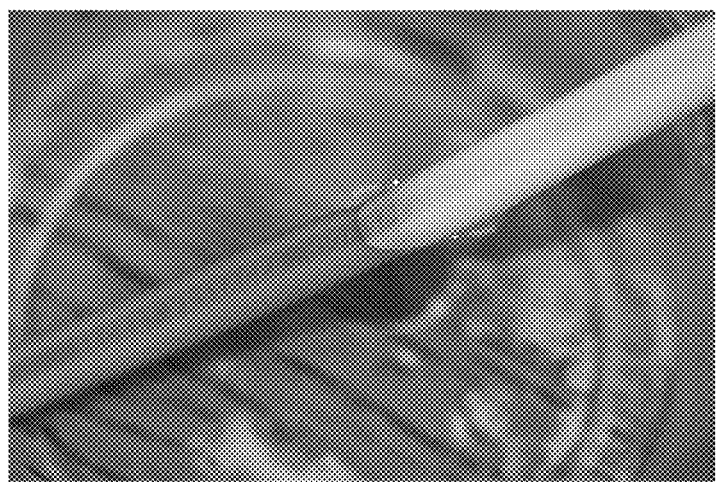
FIG. 17 provides a picture of a straw having color change message reveal capability, according to an embodiment of the invention.
Figure 18:
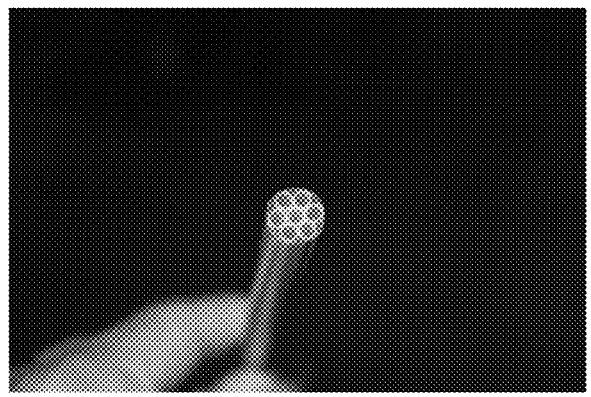
FIG. 18 provides a picture of a complex profile straw having color change capability, according to an embodiment of the invention.

Straws were individually printed with bar codes by further laser marking with a high-speed 50 watt YAG laser marking system (laser from Keystone Lasers, Nanjing China). Wording and graphics were also imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. A picture of the straws is provided in FIG. 16.

17. Message Reveal Straws

For straw manufacturing, 100 kg of a multi-element additive/master batch composition was prepared. 99% extrusion grade polypropylene (BASF-YPC F401) was admixed with 2% pelleted laser marking additive (antimony-tin oxide), and 1.0% standard white colorant for background contrast and opacity (Clariant, West Chicago, Ill.). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Stripes were co-extruded on straw walls using a triple extrusion system: a main core-extruder equipped with two side extruders. Polypropylene stripe compositions were prepared with standard pelleted master batch as above, but without color change composition added. 12% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed 88% (BASF-YPC F401) to either side extruder. Strip width and thickness were maintained during the extrusion process to ensure wall thickness and profiles met product specifications.

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straw stripes were successfully tested for color appearance at 15° C. in cold ice water.

Straws were further laser marked with a high-speed 50 watt $CO_2$ laser marking system (laser from Keystone Lasers, Nanjing China). Wording and graphics were ablated by the laser using 10-30 watts power depending on the marking speed utilized and intensity desired. Clear and definitive working, messages, symbols, and logos were printed with irreversible markings. Markings were permanent and maintained without any rub-off during use and during the color change process.

18. Complex Profiled-Striped-Color Change Straws

For inner core multi-tube wall straw manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 1.0% standard white colorant for background contrast and opacity (Clariant, West Chicago, Ill.), and 93% extrusion grade polypropylene (BASF-YPC F401). The composition was mixed thoroughly and added to a straw extrusion-production line. For outer core wall 100 kg of extrusion grade polypropylene (BASF-YPC F401) was utilized to maintain clarity.

Zone temperatures were maintained between 210-220° C. throughout the production run. A 3 meter water bath was utilized for cooling. Moderate air pressure (2-10 psi) was used to maintain a round profile. A complex extrusion dye (0.1 per circular core, 7 cores total) was used to develop the hexagonal complex core profile. An extrusion puller was utilized to maintain speed and tube integrity as well as to feed a rotating cutter. Extrusion speeds were maintained at between 3-10 straws per second (8 inch cut lengths). A highly acute angle blade was required for clean cutting and cleavage (15 degrees). Straws were successfully tested for internal core color development appearance at 15° C. in cold ice water.

19. Photochromic Color Change Stripes on Laser Marking Straws

For straw manufacturing, 100 kg of a multi-element additive/master batch composition was prepared. 99% extrusion grade polypropylene (BASF-YPC F401) was admixed with 2% pelleted laser marking additive (antimony-tin oxide), and 1.0% standard white colorant for background contrast and opacity (Clariant, West Chicago, Ill.). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Stripes were co-extruded on straw walls using a triple extrusion system: a main core-extruder equipped with two side extruders. Polypropylene stripe compositions were prepared with 12% polypropylene pelleted purple, blue, or yellow photochromic master batch (Segan Industries, Inc., Burlingame Calif. as admixed 88% (BASF-YPC F401) to either side extruder. Strip width and thickness were maintained during the extrusion process to ensure wall thickness and profiles met product specifications.

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straw stripes were successfully tested for photochromic color appearance at in sunlight.

Figure 19:
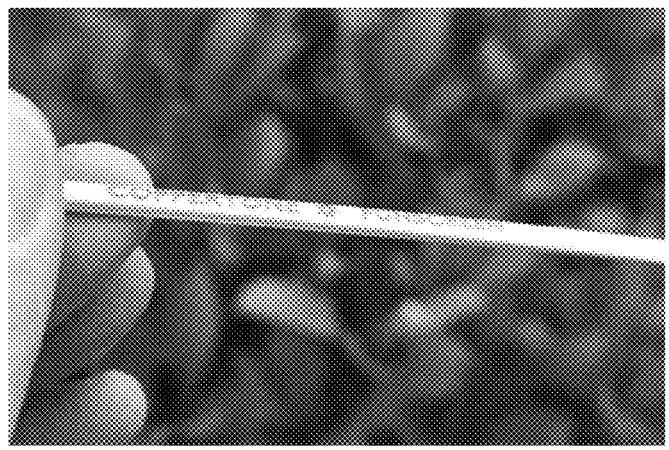
FIG. 19 provides a picture of a straw having color change strips and laser mediated marking, according to an embodiment of the invention.

Straws were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. A picture of the straw is shown in FIG. 19.

20. Raised 3D Laser Embossed—Color Change Product Substrates

A multi-element composition was prepared and mixing to consumable plastic products whereby the plastic composition includes Estane™ (Estane thermoplastic polymer, Noveon, Belgium) at 70%, LDPE polyethylene at 22% (Ashland Chemicals), 400 mesh aluminum powder at 1%, and pelleted thermochromic 25° C. master batch at 7% (Segan Industries, Inc. CA). The composition was mixed thoroughly and added to a straw extrusion-production line. Zone temperatures were maintained between 150-170° C. throughout the production run. A one foot wide continuous sheet was formed in a calendar roller system.

Figure 20:
FIG. 20 provides a picture of a color change substrate having laser embossed word features, according to an embodiment of the invention.

Formed sheets were and debossed or raised above the plain of the surface using a 50 watt YAG laser marking system. The resulting plastic sheets exhibited embossing up to 100% of the sheet thickness where marked. Sheeted materials also exhibited reversible color change characteristics when exposed to temperatures above and below the color change set point of 25° C. A picture is provided in FIG. 20.

21. Color Change Laser Marked Plastic Consumable Spoon

A multi-element composition was prepared as in examples above for injection molding manufacturing, 100 kg of a multi-element additive/master batch composition was prepared. 7% polypropylene pelleted color change master batch (Segan Industries, Inc., Burlingame Calif.) containing a 15° C. clear to blue, magenta, yellow, green, vermillian, red, purple, black or mixes thereof color change thermochrmomic was admixed with 2% pelleted laser marking additive (antimony-tin oxide), 1.0% standard fluorescent colorant for background contrast and opacity (Food contact approved, Dayglo Inc. Cleve; and OH, West Chicago, Ill.), and 90% injection molding grade polypropylene (BASF-YPC F401). The composition was mixed thoroughly and added to an injection molding machine equipped with a 12 cavity spoon mold (2.5 gm/spoon, 250 ton Arburg injection molding machine).

Figure 21:
FIG. 21 provides a picture of color change laser marked spoons according to an embodiment of the invention.

Spoon handles were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. Spoons were successfully tested for color appearance at 15° C. in cold ice water. A picture of the spoons is provided in FIG. 21.

22. Color Change Laser Marked Plastic Consumable Thermometers

A multi-element composition was prepared as in examples above for injection molding manufacturing, 100 kg of a multi-element additive/master batch composition was prepared. 7% polypropylene pelleted color change master batch (Segan Industries, Inc., Burlingame Calif.) containing a 62° C. clear to blue, magenta, yellow, green, vermillian, red, purple, black or mixes thereof color change thermochrmomic was admixed with 2% pelleted laser marking additive (antimony-tin oxide), 1.0% standard fluorescent colorant for background contrast and opacity (Food contact approved, Dayglo Inc. Cleve; and OH, West Chicago, Ill.), and 90% injection molding grade polypropylene (BASF-YPC F401). The composition was mixed thoroughly and added to an injection molding machine equipped with a 36 cavity spoon mold types (0.6 gm/spoon, 250 ton Arburg injection molding machine).

Figure 22A:
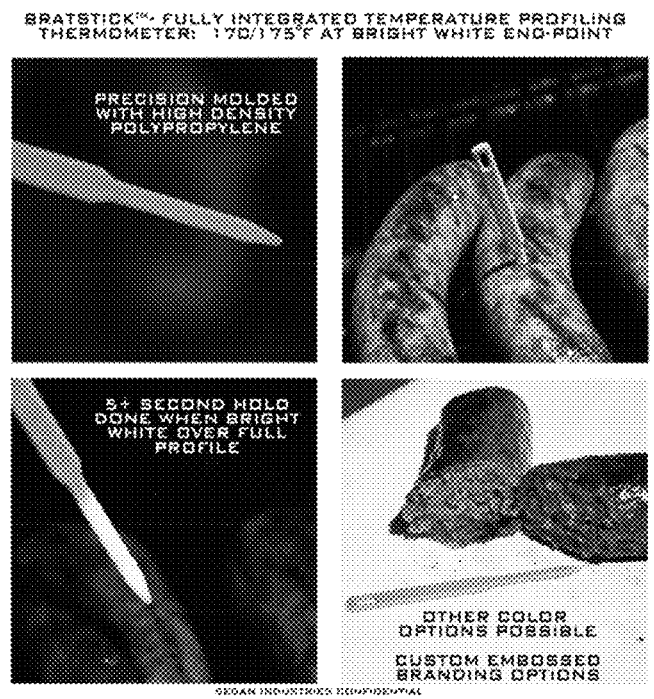
FIGS. 22A and 22B provide a pictures of color change laser marked cooking thermometers according to an embodiment of the invention.
Figure 22B:
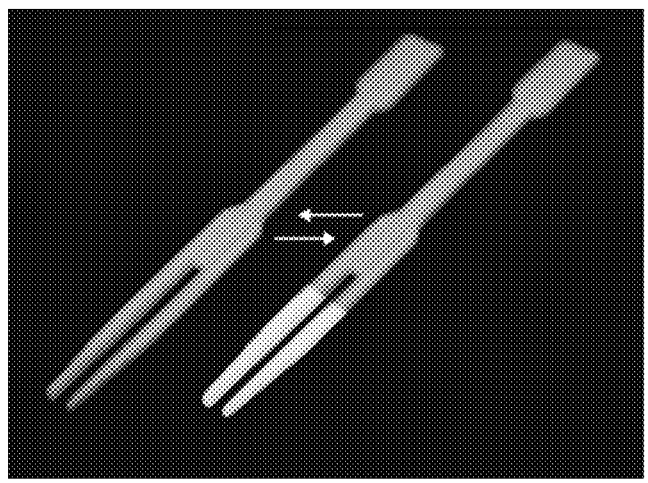

Thermometer handles were further laser marked with a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. Consumable thermometers were successfully tested for color appearance at 62° C. in cooking meats. A picture of the thermometers is provided in FIGS. 22A and 22B.

23. Interactive/Integrated Single-Dose Sunscreen Packaging

Straws for sunscreen packaging were prepared as above. UV photochromic stripes were co-extruded on straw walls using a triple extrusion system: a main core-extruder equipped with two side extruders. Polypropylene stripe compositions were prepared with 12% polypropylene pelleted purple, blue, or yellow photochromic master batch (Segan Industries, Inc., Burlingame Calif. as admixed 88% (BASF-YPC F401) to either side extruder. Strip width and thickness were maintained during the extrusion process to ensure wall thickness and profiles met product specifications.

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straw stripes were successfully tested for photochromic color appearance at in sunlight.

Straws were further laser marked with a sunscreen logo using a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process.

Figure 23A:
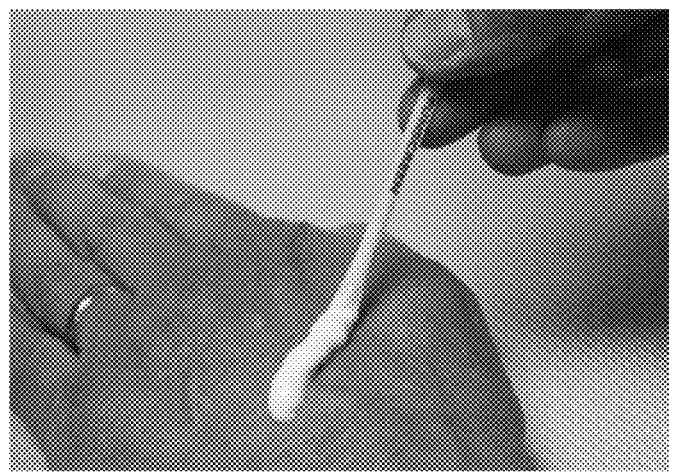
FIGS. 23A and 23B provide pictures of a sunscreen filed color change laser marked straw according to an embodiment of the invention.
Figure 23B:
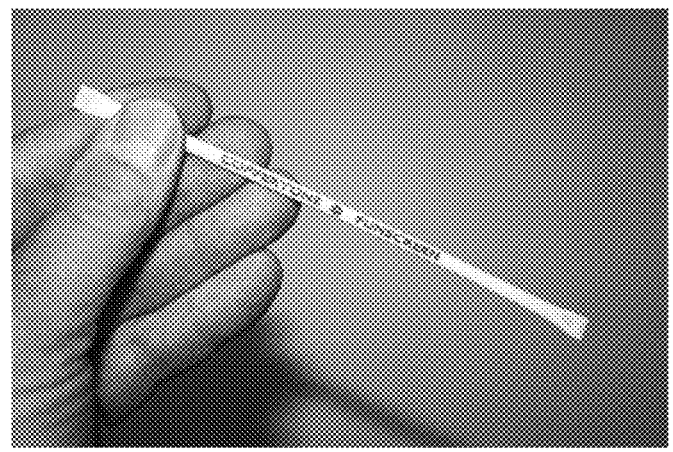

Straws were filled with an SPF sunscreen and heat sealed at both ends using a semi-automated heat sealer. Convenient notches were die-cut at on end so that the end of the packaging straw could be easily opened. Single dose sunscreen was easily applied for uses. Sunscreen could be conveniently be squeezed from the straw packaging container. Pictures of such a straw are provided in FIGS. 23A and 23B.

24. Thermochromic Pseudo Master Batch Composition

As described earlier, master batch production enables lower cost aqueous slurry-based additives such a newly formed thermochromic or photochromic micro-encapsulated color change compositions to rapidly be converted into a convenient to use plastic-based composition. Preparation of pseudo master batch begins with mixing of an aqueous slurry comprising an additive of interest with a cationic, non-ionic, or anionic plastic emulsifier and a powdered plastic resin. The mixture is thoroughly mixed and completely flash dried into a powder, granular form, flake form, or particulate form depending on the application of interest. Dried pseudo master batch materials eliminates the need to further extrude and pellitize additives.

10 kg pseudo master batch was prepared using 25% by weight aqueous thermochromic slurry (60° C. blue, BPA-free at 50% by weight micro-encapsulated pigment, Segan Industries, Inc. CA), 25% by weight aqueous liquid surfactant (Michelman Corp. ME09730), and 50% by weight powered polyethylene (ROTO PE 625662, Ashland Distribution). Each component was added to a mixing vessel and mixed thoroughly to a uniform paste. The paste was flash spray dried in a drum dryer at below the melting transition of the PE (210° F.) and collected as a large granulated composition (0.1 inch diameter average particle size). Dried pseudo master batch could be used directly for PE or PP extrusion or injection molding applications between 2% to 10% by weight in the molding resin. Molded articles prepared with pseudo master batch showed good color uniformity and thermochromic color change activity at the intended temperature for use.

25. Photochromic Pseudo Master Batch Composition 10 kg photochromic pseudo master batch was prepared using 25% by weight aqueous photochromic slurry (photochromic blue, BPA-free at 50% by weight micro-encapsulated pigment, Segan Industries, Inc. CA), 25% by weight aqueous liquid surfactant (Michelman Corp. ME09730), and 50% by weight powered polyethylene (ROTO PE 625662, Ashland Distribution). Each component was added to a mixing vessel and mixed thoroughly to a uniform paste. The paste was flash spray dried in a drum dryer at below the melting transition of the PE (210° F.) and collected as a large granulated composition (0.1 inch diameter average particle size). Dried pseudo master batch could be used directly for PE or PP extrusion or injection molding applications between 2% to 10% by weight in the molding resin. Molded articles prepared with photochromic pseudo master batch showed good color uniformity and UV/sun induced photochromic color change activity at the intended exposure levels use.

26. Interactive/Integrated Multi-Element Powdered Drink Packaging

Innovative multi-element packaging types described here include: using a high-speed printable straw as an actual package, the straw as a powdered drink delivery means for adding powdered mixes, the color change in the straw as a means for indicating serving temperatures and visual entertainment, and the straw body as a means of stirring the powdered mix.

For straw manufacturing, 100 kg of a multi-element additive/master batch composition was prepared. 7% polypropylene pelleted color change master batch (Segan Industries, Inc., Burlingame Calif.) containing a 60° C. and/or 15° C. clear to blue, magenta, yellow, green, vermillian, red, purple, black or mixes thereof color change thermochrmomic was admixed with 2% pelleted laser marking additive (antimony-tin oxide), 1.0% standard white colorant for background contrast and opacity (Clariant, West Chicago, Ill.), and 90% extrusion grade polypropylene (BASF-YPC F401). The composition was mixed thoroughly and added to a straw extrusion-production line. Zone temperatures were maintained between 210-220° C. throughout the production run. A 3 meter water bath was utilized for cooling. Moderate air pressure (2-10 psi) was used to maintain a round profile. A round extrusion dye (2.0 cm dia.) was used to develop a circular profile. An extrusion puller was utilized to maintain speed and tube integrity as well as to feed a rotating cutter. Extrusion speeds were maintained at between 3-10 straws per second (8 inch cut lengths).

Straw diameters were maintained at from 0.1 inch to 0.6 inches in diameter depending on the intended application. Thinner straws were utilized as sipper stirrers, midsized diameter straws were used as fountain and beverage straws, medium to wide straws were used for milkshakes and smoothies, and wide diameter straws were used for bubble tea and the like. Straws were successfully tested for color change at 60° C. in hot water or at 15° C. in cold water.

Straws were further laser marked with a product logo and instructions using a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process.

Straws were filled with powdered drink mixes including coffee, chocolate, fruit drinks, power aid drinks, cold relief medications in powdered form and sealed at both ends with a dissolve away gel cap end. Convenient gel cap sizes were placed at the end of the straw for easy pinch removal and for rapid dissolve away characteristics.

27. Multi-Element Tactile, Insulating, Temperature Sensing Inks

Multi-element inks described below have the advantage over inks standard to the printing industry in that they can provide the products with new capabilities and properties including, but not limited to: hot insulating, cold insulating, color change, tactile feel, gripping characteristics, embossed appearances, 3-D visual effects, and related features. Multi-element inks can be utilized in combination with standard flexograpic, screen, printing pad printing and other commonly used printing processes.

A multi-element tactile/embossed, insulating, and color change ink was prepared by adding 10% by weight 5° C. blue BPA-free thermochromic aqueous slurry (from: Segan Industries, Inc, Matsui International Inc., or LCR Hallcrest), 1% by weight aqueous red fluorescent dye slurry (Dayglo Inc.), 6% wet unexpanded expansion component (Expancel 031 WU 40), and the remainder 78% by weight plastisol screen ink base (10140 clear, Wilflex Corp.). The composition was thoroughly mixed with a mechanical mixer until the composition was uniform.

Figure 24A:
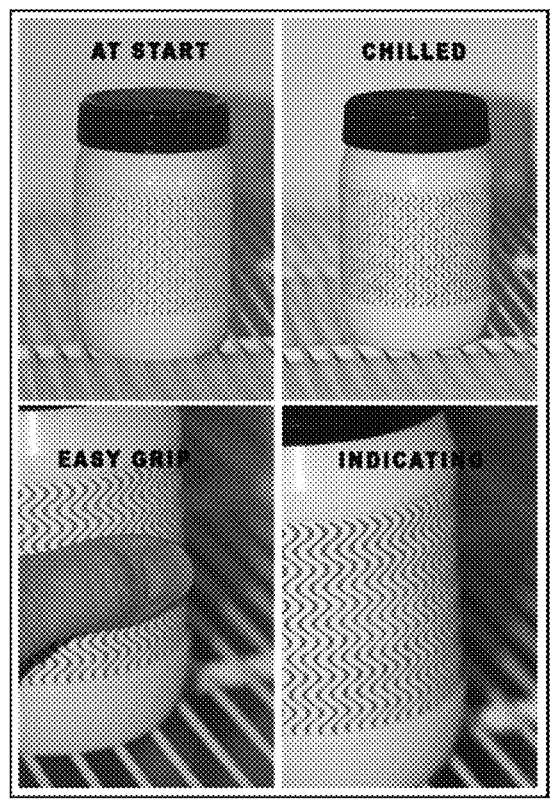
FIGS. 24A and 24B provide pictures of a color change tactile ink according to an embodiment of the invention.
Figure 24B:
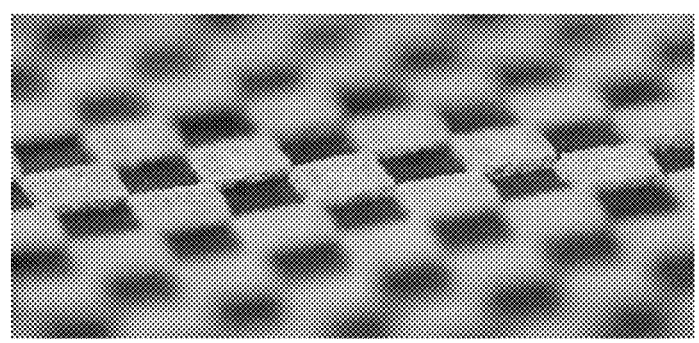

Various repeat patterns and graphics were printed using silk screen using form 156 mesh screens to 90 mesh screens. Typically, 110 to 123 screen meshes were used. Labels were printed on lay-flat polyester or vinyl pressure sensitive labels stock. Printing was accomplished using an automated screen printer (ATMA unit). Printed labels were expanded to a raised level of 300-500% at 240° F. using a black body radiant conveyor heating source. Expanded multi-element labels were applied to various cups, food jars and other packages. Labels were highly tactile, insulating to the touch and textured to the touch with excellent gripping features. Labels changed color upon cooling and reversibly upon heating. Pictures are provided in FIGS. 24A and 24B.

28. Multi-Element Tactile, Insulating, Temperature Light Sensing Inks

Multi-element inks described below have the advantage over inks standard to the printing industry in that they can provide the products with new capabilities and properties including, but not limited to: hot insulating, cold insulating, color change, tactile feel, gripping characteristics, embossed appearances, 3-D visual effects, and related features. Multi-element inks can be utilized in combination with standard flexograpic, screen, printing pad printing and other commonly used printing processes.

A multi-element tactile/embossed, insulating, and photochromic color change ink was prepared by adding 15% by weight 5° C. blue, red, orange, yellow, green, and purple photochromic aqueous slurries (from: Segan Industries, Inc, Matsui International Inc. or LCR Hallcrest), 8% wet unexpanded expansion component (Expancel 031 WU 40), and the remainder 77% by weight plastisol screen ink base (10140 clear, Wilflex Corp.). The composition was thoroughly mixed with a mechanical mixer until the composition was uniform.

Figure 25:
FIG. 25 provides a picture of a color change tactile ink according to an embodiment of the invention.

Various repeat patterns and graphics were printed using silk screen using form 156 mess screens to 90 mesh screens. Typically, 110 to 123 screen messes were used. Labels were printed on lay-flat polyester or vinyl pressure sensitive labels stock. Printing was accomplished using an automated screen printer (ATMA unit). Printed labels were expanded to a raised level of 300-500% at 240° F. using a black body radiant conveyor heating source. Expanded multi-element labels were applied to various cups, food jars and other packages. Labels were highly tactile, insulating to the touch and textured to the touch with excellent gripping features. Labels changed color upon UV and sunlight exposure. A picture is provided in FIG. 25.

29. On-Demand Imaged Multi-Element Tactile, Insulating, Sensing Inks

Multi-element inks described below have the advantage over inks standard to the printing industry in that they can provide the products with new capabilities and properties including, but not limited to: hot insulating, cold insulating, color change, tactile feel, gripping characteristics, embossed appearances, 3-D visual effects, and related features. Multi-element inks can be utilized in combination with standard flexograpic, screen, printing pad printing and other commonly used printing processes.

A multi-element tactile/embossed, insulating, and color change ink was prepared by adding 12% by weight 60° C. red irreversible BPA-free thermochromic aqueous slurry (from: Segan Industries), 15% wet unexpanded expansion component (Expancel 031 WU 40), and the remainder 73% by weight water base flexographic binding ink vehicle (Thermostar flexographic binder, TMC Hallcrest, Inc.). The composition was thoroughly mixed with a mechanical mixer until the composition was uniform.

Figure 26:
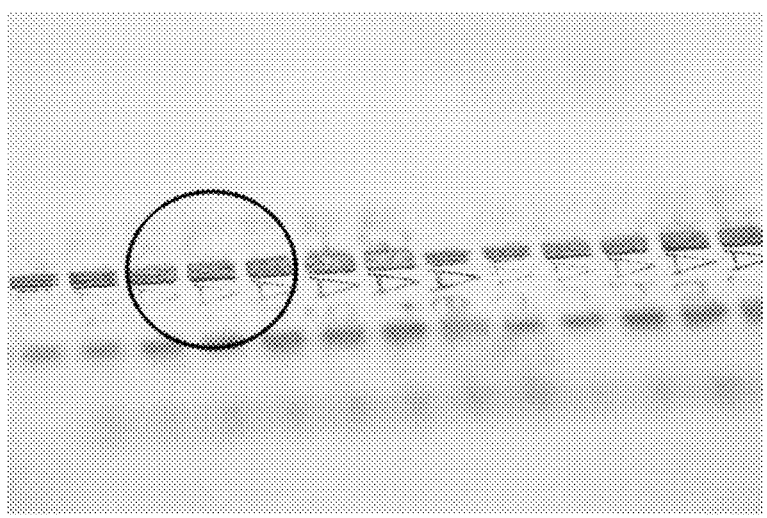
FIG. 26 provides a picture of a color change tactile ink according to an embodiment of the invention.

Food printed labels were printed using silk screening with a 156 mesh screen. Labels were dried with forced air prior to use. Raised, colored discrete on-demand patterns were printed using a 50 watt $CO_2$ laser (Keyence Corp.) Labels were highly tactile, insulating to the touch and textured to the touch with excellent coloration and features where exposed to the laser beam. A picture is provided in FIG. 26.

30. Multi-Element Laser Markable, Thermochromic, And Photochromic Plastic Sheets Interactive plastic sheet for activity and packaging were prepared as above. UV photochromic, thermochromic and laser marking compositions were co-extruded on into sheet forms with a triple extrusion system: a main core-extruder equipped with two side extruders. Compositions were prepared with 6% polypropylene pelleted purple, blue, or yellow photochromic master batch (Segan Industries, Inc., Burlingame Calif.), 6% 25° C. blue, magenta, yellow, red, or green thermochromic pelleted master batch (Segan Industries, Inc., Burlingame Calif.), and 2% YAG laser marking additive (Segan Industries, Inc, or PolyOne Corp.) and admixed with 82% (BASF-YPC F401) to either side extruder. Sheet width and thickness were maintained during the extrusion process to ensure wall thickness and profiles met product specifications.

Figure 27A:
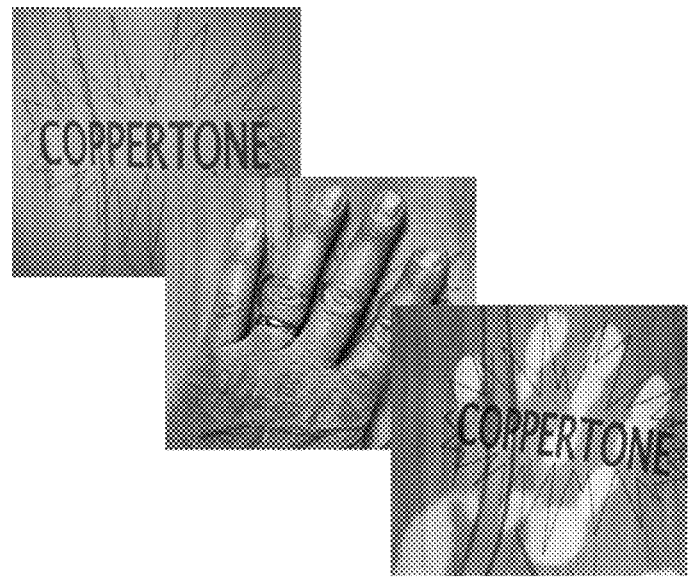
FIGS. 27A and 27B provide pictures of a color change laser marked sheet according to an embodiment of the invention.
Figure 27B:
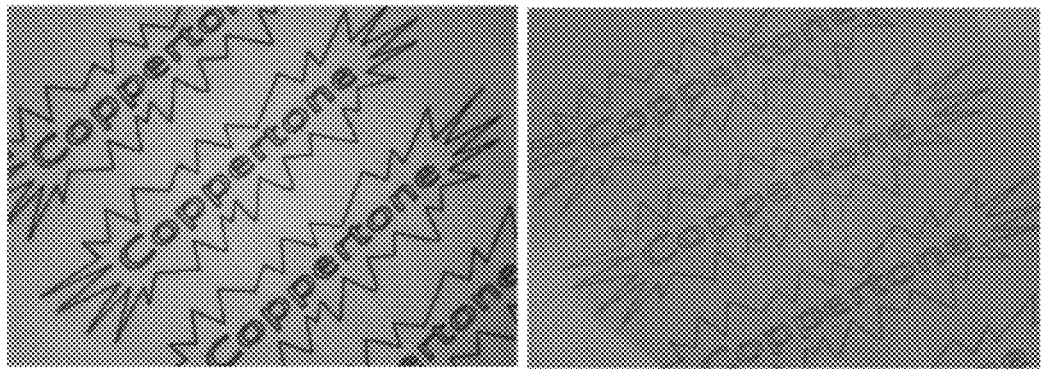

Plastic multi-element sheets were further laser marked with a sunscreen logo using a high-speed 50 watt YAG laser marking system (laser from Keystone Lasers, Nanjing China). Wording and graphics were imprinted using 0.1 to 10 watts power depending on the marking speed utilized and intensity desired. Clear and definitive working, messages, symbols, and logos were printed with irreversible markings. Markings were permanent and maintained without any rub-off during use and during the color change process. Sheets were further successfully tested for photochromic and thermochromic characteristics at the intended set points for UV exposure and temperature exposures. Pictures of the sheet are provided in FIGS. 27A and 27B.

31. Laser Debossed Foam Trays

Figure 28:
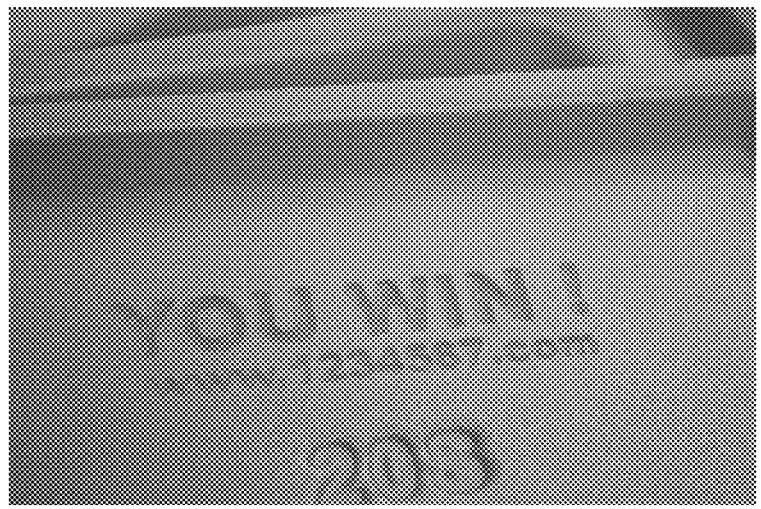
FIG. 28 provides a picture of laser embossed foam tray according to an embodiment of the invention.

A foam tray was laser embossed, as shown in FIG. 28.

32. Low Temperature Reversible Medical Health Care Product Application

Figure 29A:
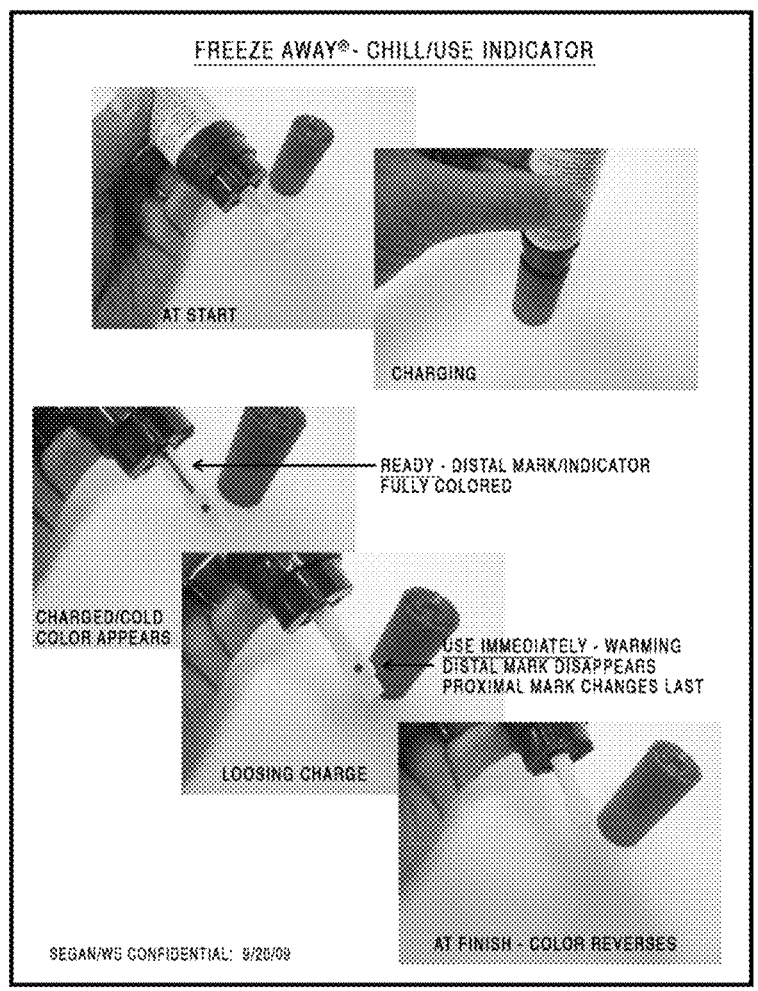
FIGS. 29A and 29B provide pictures of color change plastic health care products according to an embodiment of the invention.
Figure 29B:
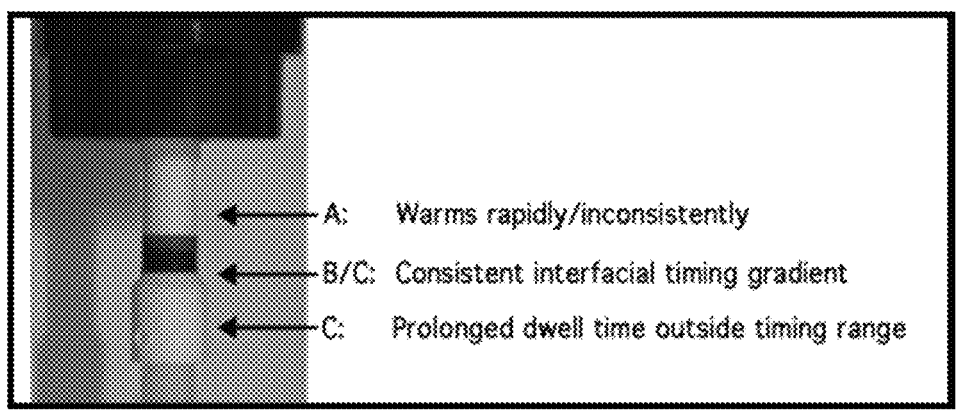
Figure 30A:
FIGS. 30A to 30E provide pictures of expandable straws according to an embodiment of the invention.
Figure 30B:
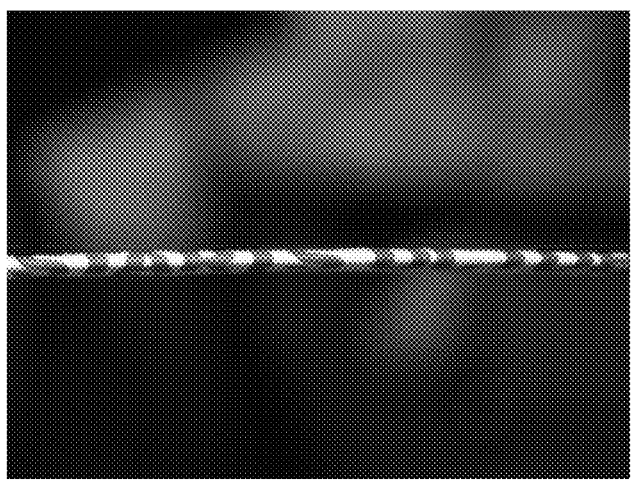
Figure 30C:
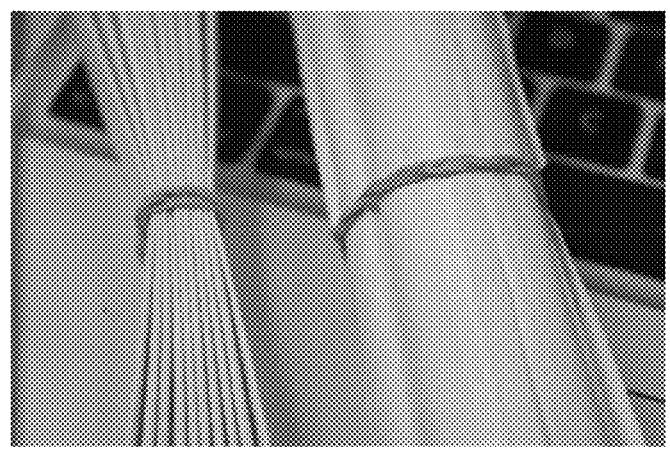
Figure 30D:
Figure 30E:
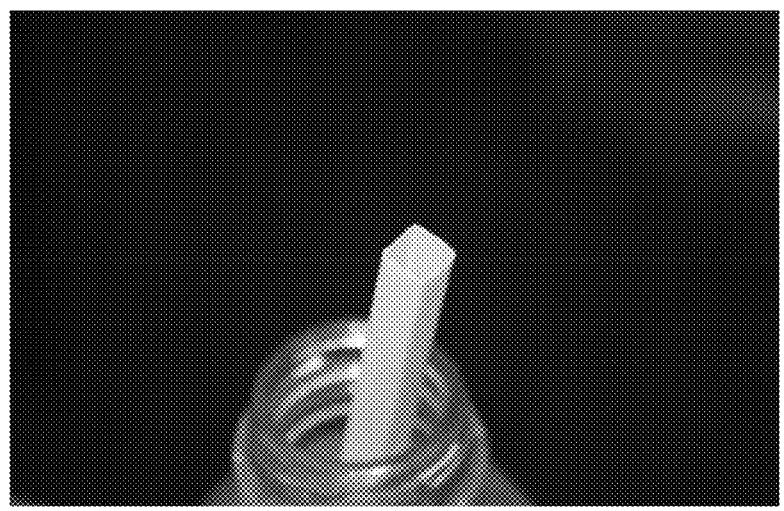

FIGS. 29A and 29B provide pictures of a plastic medical device having color change capability, according to an embodiment of the invention.

33. Physically Expandable Consumables

As fuel, international shipping, domestic shipping, inventory, logistics, packaging, handling, procurement, disposal costs, and related product costs associated with consumable items has continued to rise, there is on-going and increasing demand to develop new compositions, product formats, packaging, an designs to lower costs and increase efficiencies. Herein is described a novel approach to significantly condensing the spatial packaging, shipping, and inventory volume associated with drinking straws and related items.
Cylindrical straws can be compressed to a finite profile whereby the compression line-seam can be utilized to re-establish a square tubular profile without adversely affecting the drinking straw performance.
Pre-formed cylindrical straws and be flattened with or without applied heat using a continuously rotating pinch roller or other compression means. Heat provides the advantage of controlling the degree and level of flattening.
Pre-wrapped or un-wrapped straws can be flattened. Un-wrapped straws can be pre-flattened and then subsequently paper or film wrapped. Flattening wrapped straws has the advantage of utilizing existing production equipment for making and wrapping straws. Since typical wrapping films and papers are compliant with compression, the pre-wrapped straws can be flattened directly in their wrapper.
Pre-wrapped flattened straws can be sequentially or in parallel stacked and packaged in a highly condensed format. Flattened—wrapped straws can be stacked vertically and subsequently banded for further condensation. Stacks can be organized side-by-side for final packaging.
Flattened, wrapped or unwrapped straws can be condensed between from 10% to over 600%. More often straws can be condensed between 100% to 500%. Typically, flattened straws can be condensed between 300% and 400% thereby significantly reducing spatial packaging requirements compared to non-condensed straws or other applicable consumables.
Condensed—expandable straws can be further modified and functionalized using by way of example, but not limitation, a combination of profile extrusion (e.g. square or other geometrical profiles), striping, and other means for controlling the final condensed and expanded shape.
Embossed, debossed, and textured features can be incorporated in to expandable straws during the compression process. By way of example, not limitation, compression or pinch rollers used to flatten straws can included embossing, debossing, or textured patterns. During the flattening process, surface features can be incorporated into the straw surface. Messages, logos, symbols, advertisements, recycling symbols and the like can be included to provide further premium value to the staws.

Pictures of the straws is condensed and expanded form are provides in FIGS. 30A to 30E.

A method for producing physically expandable straws includes the following resources and processes: maintain plastic or film wrapped straw in sleeve. Adjust pinch rollers to a setting where the caliper marginally makes contact between rollers. Maintaining the optimal spacing between rollers will reduce potential warping. Pass wrapped straw through the roller press operating the rollers slowly and with constant speed. Initiating of compression can be accomplished by pinching the shovel end of the straw closed as you insert it between the rollers. In the event of using a spoon straw with a shovel, the shovel tip and flatten as the straw is passed through a subsequent laminator. The second parallel crease is accomplished by passing the straw through a pre-headed laminating roller set operating at 70V using a variable voltage the transformer to adjust heat to 250° F. The subsequent crease will flatten the straw perpendicular to the cold crease for ease of opening.

Possible aberration are to be considered as follows. Melting: If running too hot, the laminator will melt the walls of the straw together and make it difficult to open. Torsional warping: Occurs when the cold crease doesn't run along the center of the straw on both sides, usually because it was not perfectly aligned when the straw was passed through the laminator. Torsional warping will give the straw a rectangular shape, rather than the preferred square, with less ease of opening. Longitudinal warping: Present in almost all straws. Can be corrected by rotating the straw 180° and passing it through the laminator a second time, or by weighing down the ends of the straw on a surface with concavity opposite to that of the warped straw.

34. Novel Digital Advertising Informational Vessels

Device that couples functional usage with digital displays including LCD's, electroluminescent displays, OLED's, and other flat flexible screen displays can be integrated into cups, plates, placemats, and a variety of other items used at the retail level to provide digital wireless images, messages, video clips, ad promotional information, and a variety of other information to consumers using said product. The system provides for advertising and informational space/copy/information to be paid for or rented pay a promoter in the space being rented by the renter.

Applications: Plates, utensils, cups and other reusable and consumable items. QSRs etc. Table waiting devices tells when ready. Service etc. Airports. Starbucks. Packaged goods. Returnable items. Encourage return. News magazines and a broad range of other promotional, news, and informational formats and customers can take advantage of the innovation for relaying content, promotions, ads, commercials and the like.

35. Flavor Selector Cup

A flavor or additive selector cup can be produced using a bottom that can be selectively pierced to release a condensed dissolvable composition into the liquid content filling the cup. A selector cup can have one or more sealed compartments at the bottom of the cup. Each sealed compartment can have a dissolvable-dispersable composition. The cup inside is sealed such that water or other beverage liquid can be added without resulting in dispersion or mixing since the composition is partitioned. After adding a liquid to the cup, one or more of the sealed cavities can be opened by pressing an implement such as a straw, spoon or buy finger compression from the bottom up to expose one or more of the compartments to the fluid in the cup. The liquid and composition can then be dispersed and mixed to complete a desired final beverage mix for consumption.

The innovation has the advantage of easy stacking (cup in cup), can be shipped dry to reduce weight, provides a lower overall cost compared with a bottle and cap, and will be manufactured in a completely different manner. Pelleted compositions to be used as selective ingredients produced by extrusion or the like that will combine the composition ingredients into a high surface area pelleted mix that can be easily dispersed upon hydration of the liquid. The pelleted composition has the advantage of easy placement into a preformed cup for subsequent sealing. Other forms of the composition can include concentrated liquids, tablets, wafers, powders, and the like.

Figure 31A:
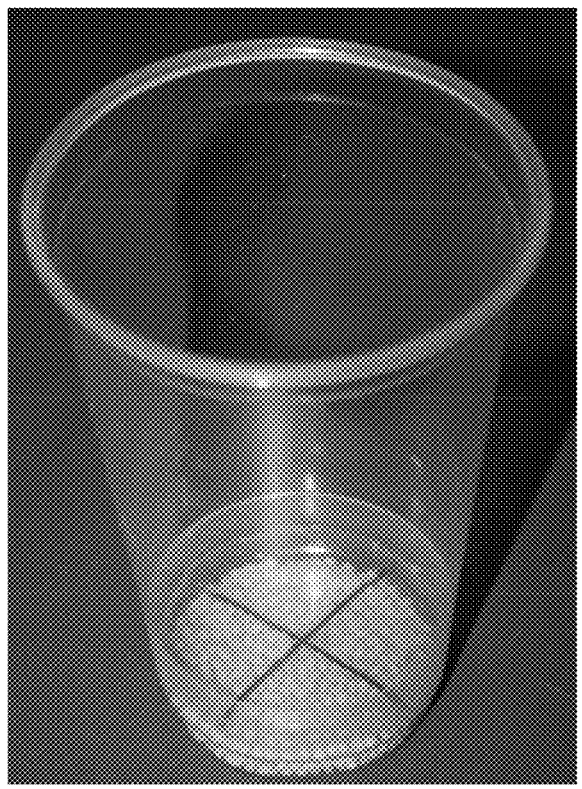
FIGS. 31A and 31B provide views of a flavor selector cup according to embodiments of the invention.
Figure 31B:
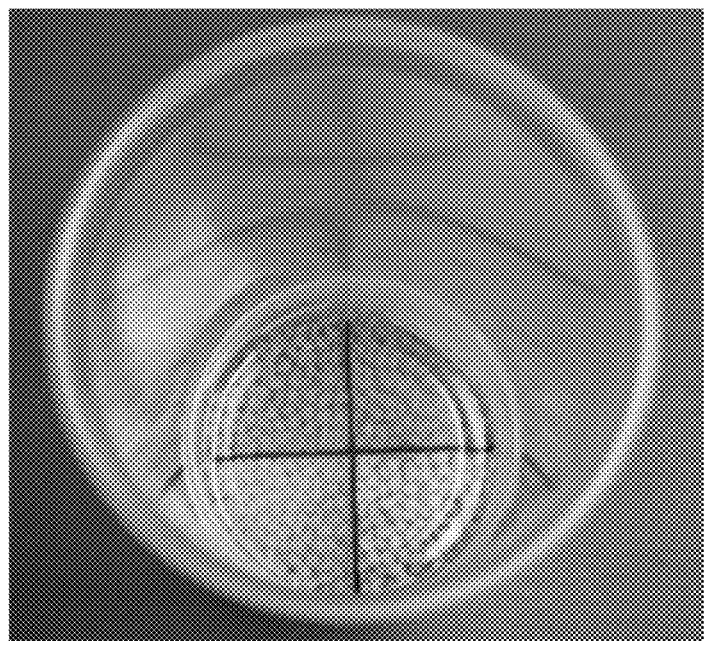

Selector cups can be injection molded or thermoformed depending on the application of interest. Importantly, each ingredient compartment must be sealed according for extended dry shelf life as well as protection against unintended fluid leakage during use. Each ingredient compartment should be easily pierced for opening during use. Compartments can be made facile for piercing by molding tear or breach lines above the compartment containing a particular ingredient. The tear or breach lines can range from 0.0005 inches to 0.05 inches in thickness. More often, tear lines will be molded between 0.01 and 0.001 inches in thickness. Typically breach or tear segments will be between 0.005 and 0.002 inches. The exact thickness will be product and application dependent. A picture is provided in FIGS. 31A and 31B.

36. Additional Examples of Embodiments of the Invention

Barcoded promotional straw with iPhone application; Color change bio-degradable straws and consumables; Clarifying additives to resins used for straws; Color change/shape memory in straws; Integrated meat trays and food packaging; Expanded thin walled and thick walled straws; Air co-extruded products; Laser embossed foam meat trays; Temperature indicating meat trays; Extruded expansion Pop Up thermometer; DOD ink jet printed high-speed messaging straws; Plastic jet printed straws; Controlled digital steppers for puller system; Pulsed air jet, pulsed vacuum texturing; Frequency harmonic profiling; Hydrophylic/hydrophobic imaging: ent ink, etched, with or without thermochromic agent; Reversible fluorescent nylon molded color indicating in-product thermometers; Microcapillary pathways; Flavor release in straws and cups; Flash imaging in cups; Spiral co-extruded; Message reveal; Natural dye chemistry; Shape Memory straws; Self retracting straws; Landfill degradable color change straws; Conductive metal coated plastic straws; Perforated straws for pressure and delivery regulation; Channeled and contoured; Glow in the dark products; Optical light piping using co-extruded light piping plastic; Elastic straws; Metering straws for medical applications; pH indicating straws; Co-packaging integration; Meat tray integration; Extruded disposable thermometers; Edible plastic staws; Image appear labels on PP cup; In molded thermoformed label on lid; Printed image on cup lid; Novel extruded Pop-Up thermometer types; Image of only water in selective patterned areas—absorbent ink, etched, with or without thermochromic agent; Image due to thermal cooling; A combination of water and thermal cooling; Reversible fluorescent nylon molded color indicating in-product thermometers; Fluorescent pigments in nylon part inserted into oven products that change color upon through cooking:—extruded and angle cut,—injection molded,—Low medium high temperature,—Optical high speed engraving and encoding,—New applications for straw e.g. plant stem hydration,—Bristle formation using cutting or engraving,—Lids, cups, utensils,—Insulation properties; Dry vs wet colorant and resin; Laser engraving to generate latent images; Insulables™ Printed insulating labels; Insulating and detecting compositions: Hot insulating, Cold insulating, Hot indicating, Cold indicating, In-line printable, Stops sweating and moisture build up, Improves grip; Provides 3-D optical experience; Cups, inks, lids, bowls, meat tray packs; Printpack sensing expansion; SA bags thermal tactile; Perseco insulating cups; Expanded recycled PP—Pride; Printed expanded insulating ink Pride; Volk microwave sensors; TMS thermal mediums; 3D flash imaging; Multi-element micro encapsulating heat absorbing compositions, e.g. insulating inks in combination with heat absorbers Multi-layer structures with air gaps, etc.

Various other modifications and alternations in the structure and method of operation of the present disclosure will be apparent to those skilled in the art without departing from the scope and spirit of the present disclosure. Although the present disclosure has been described in connection with specific embodiments, it should be understood that the present disclosure as claimed should not be unduly limited to such specific embodiments.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A consumable product comprising a plastic that comprises an incorporated color change component, the color change component comprising:
   one or more components selected from the group consisting of a thermochromic color-change compound, a photochromic color-change compound and a background colorant; and
   an antimony-doped tin oxide laser marking additive,
   wherein the consumable product is selected from the group consisting of drinking straws, cups, lids, plates, utensils, disposable cooking thermometers and stir sticks.

2. The consumable product according to claim 1, wherein the color change components comprise:
- an antimony-doped tin oxide laser marking additive;
- a thermochromic color-change compound or a photochromic color-change compound; and
- a background colorant.

3. The consumable product according to claim 2, wherein the color change component comprises a thermochromic color change compound.

4. The consumable product according to claim 1, wherein the thermochromic color change is a reversible thermochromic color change.

5. The consumable product according to claim 1, wherein the photochromic color change is a reversible photochromic color change.

6. The consumable product according to claim 1, wherein the color change components provide for the appearance of two or more distinct colors in response to a thermal stimulus.

7. The consumable product according to claim 1, wherein the color change components comprise from 1% to 5% of the total weight of the product.

8. The consumable product according to claim 1, wherein the consumable product is formed by:
- combining the plastic as a plastic emulsifier and plastic resin with the color change component to produce a color change plastic; and
- flash drying the color change plastic.

9. The consumable product according to claim 8, wherein the plastic emulsifier, plastic resin and color change component are combined as an aqueous slurry.

10. The consumable product according to claim 8, wherein the consumable product is formed from a flash-dried aqueous slurry.

11. The consumable product according to claim 1, wherein the consumable product is a drinking straw, cup, lid, plate, utensil, disposable cooking thermometer or stir stick that consists of a plastic and an incorporated color change component that consists of:
- an antimony-doped tin oxide laser marking additive;
- a thermochromic color-change compound; and
- a background colorant.

12. The consumable product according to claim 1, wherein the plastic is selected from the group consisting of polyethylene terephthalate, a tetrafluoroethylene, polyethylene, polyvinylchloride, polypropylene, a polyolefin, polyurethane and polystyrene.

13. A method of making a pseudo master batch, the method comprising:
- combining an aqueous slurry comprising an additive of interest with a plastic emulsifier and a powdered plastic resin to produce a mixture; and
- flash drying the mixture to produce a pseudo master batch.

14. The consumable product according to claim 8, wherein the plastic resin is in the form of a powder, a particulate, a granulate or flakes.

15. The consumable product according to claim 1, wherein the consumable product is a drinking straw, cup, lid, plate, utensil, disposable cooking thermometer or stir stick that consists of a plastic and an incorporated color change component that consists of:
- an antimony-doped tin oxide laser marking additive;
- a photochromic color-change compound; and
- a background colorant.

* * * * *